(12) United States Patent
Ishii et al.

(10) Patent No.: US 12,732,837 B2
(45) Date of Patent: Sep. 8, 2026

(54) BASE STATION SYSTEM, WIRELESS CONTROL UNIT, WIRELESS COMMUNICATION METHOD, AND RECORDING MEDIUM

(71) Applicant: NEC Corporation, Tokyo (JP)

(72) Inventors: Naoto Ishii, Tokyo (JP); Toshiki Takeuchi, Tokyo (JP); Daisaku Ogasahara, Tokyo (JP)

(*) Notice: Subject to any disclaimer, the term of this patent is extended or adjusted under 35 U.S.C. 154(b) by 280 days.

(21) Appl. No.: 18/665,819

(22) Filed: May 16, 2024

(65) Prior Publication Data

US 2024/0397351 A1 Nov. 28, 2024

(30) Foreign Application Priority Data

May 23, 2023 (JP) ................................ 2023-084642

(51) Int. Cl.
*H04B 10/2575* (2013.01)
*H04B 10/073* (2013.01)
*H04Q 11/00* (2006.01)
*H04W 24/06* (2009.01)
*H04W 88/08* (2009.01)

(52) U.S. Cl.
CPC ........ *H04W 24/06* (2013.01); *H04B 10/0731* (2013.01); *H04Q 11/0062* (2013.01); *H04B 10/25753* (2013.01); *H04Q 2011/0083* (2013.01); *H04W 88/085* (2013.01)

(58) Field of Classification Search
None
See application file for complete search history.

(56) References Cited

U.S. PATENT DOCUMENTS

2004/0184487 A1* 9/2004 Kim ................. H04B 10/25754 370/516
2023/0246727 A1* 8/2023 Fabbri ................. H04J 14/0278 398/34

FOREIGN PATENT DOCUMENTS

JP 2006515489 A * 5/2006
JP 2008-118253 A 5/2008
JP 2020-076751 A 5/2020

OTHER PUBLICATIONS

H. Q. Ngo, A. Ashikhmin, H. Yang, E. G. Larsson, and T. L. Marzetta, "Cell-free massive MIMO versus small cells," IEEE Trans. Wireless Commun., vol. 16, No. 3, pp. 1834-1850, Mar. 2.

* cited by examiner

*Primary Examiner* — Jai M Lee
(74) *Attorney, Agent, or Firm* — Sughrue Mion, PLLC

(57) ABSTRACT

A wireless control unit transmits to a plurality of analog sections a control signal for performing control so as to cause the plurality of analog sections to transition to a loopback mode, transmits to the plurality of analog sections an observation signal for observing delay times, calculates, for each of the plurality of analog sections, a path delay based on the number of clocks generated from when the observation signal is transmitted to when the observation signal is received, and transmits to the plurality of analog sections a control signal for canceling the loopback mode of the plurality of analog sections. In addition, the wireless control unit transmits a downlink signal at a timing calculated for each of the plurality of analog sections according to the path delay.

9 Claims, 11 Drawing Sheets

BASE STATION SYSTEM, WIRELESS CONTROL UNIT, WIRELESS COMMUNICATION METHOD, AND RECORDING MEDIUM

CROSS REFERENCE TO RELATED APPLICATIONS

This application is based upon and claims the benefit of priority from Japanese Patent Application No. 2023-084642 filed on May 23, 2023, the disclosure of which is incorporated herein in its entirety by reference.

TECHNICAL FIELD

The present invention relates to a base station system, a wireless control unit, a wireless communication method, and a recording medium.

BACKGROUND ART

In the fifth generation mobile communication system (5G), use of radio waves (millimeter waves) of a high frequency band is introduced with the aim of further increasing the communication speed. Radio waves of a high frequency band, such as millimeter waves, has a strong tendency of traveling straight. It is therefore necessary to secure a line-of-sight communication path for satisfactory quality of communication. As a solution to secure a line-of-sight communication path, a system called cell-free massive MIMO has been proposed (e.g., Non-Patent Literature 1). In cell-free massive MIMO, a large number of access points (APs) connected to a wireless control unit (broad band unit (BBU)) via wires such as optical fibers or the like are placed in a distributed manner so that a line-of-sight communication path is secured, in order to conduct transmission and reception. In cell-free massive MIMO, an APs are equipment which is composed mainly of analog circuitry and which converts electric signals to radio waves or vice versa, and reducing the size and price of the APs is an important problem.

On the other hand, in a time division duplex (TDD) scheme of a mobile communication network (RAN), from the viewpoint of avoiding interference between an uplink (UL) and a downlink (DL), it is desirable that signal transmission/reception timings in a radio path be arranged to coincide. It is therefore important in cell-free massive MIMO that the transmission/reception timings of APs be in synchronization with each other. A known conventional synchronization method is timing advance (TA).

There is a problem with the technique disclosed in Non-Patent Literature 1. The problem is that, since the distance between BBU and an AP varies according to the placement location of the AP, variation in length of the cables which connect BBU and a plurality of APs causes a difference in the transmission/reception timing among the APs. One possible solution to this problem is applying the precision time protocol (PTP) or the like to perform control to temporally synchronize BBU and APs. Additionally, an optical time-domain reflectometer (OTDR) is known as optical cable measurement equipment. With use of this OTDR, it is possible to not only measure a loss but also check the length of a fiber-optic cable, the number and positions of connection points of fiber-optic cables, a connection loss produced in the middle of conveyance of light, and reflection. In a case of using an OTDR, it is possible to find out a path delay by connecting an OTDR on the BBU-side and making the AP-side open to measure the distance between the BBU and the AP.

Patent Literature 1 discloses a technique for measuring and compensating for a delay caused between a main base station and a remote base station connected via an optical cable. According to the technique disclosed in Patent Literature 1, the main base station inserts a predetermined test pattern into the overhead part of an SDH frame, to transmit the SDH frame to the remote base station, and receives the SDH frame looped back by the remote base station to detect the test pattern; thereafter, the main base station uses the test pattern to measure a path delay. Further, at least one frame alignment word (FAW) is detected at a predetermined position within the SDH frame received, to use FAW detection information to calculate a delay error. A path delay caused by the optical cable is determined by compensating for the measured path delay having the delay error.

Patent Literature 2 discloses wireless communication equipment in which variation in transmission/reception timing in an analog circuitry section is reduced. According to Patent Literature 1, wireless communication equipment temporarily sets an antenna output control switch to an OFF state (loopback connection) immediately before starting a data transmission operation, to measure the amount of analog delay, and saves the measured amount of analog delay to automatically update a timing adjustment value in a transmission data timing adjustment section.

CITATION LIST

Patent Literature

[Patent Literature 1]
Published Japanese Translation of PCT International Application, Tokuhyo, No. 2006-515489

[Patent Literature 2]
Japanese Patent Application Publication, Tokukai, No. 2008-118253

Non-Patent Literature

[Non-Patent Literature 1]
H. Q. Ngo, A. Ashikhmin, H. Yang, E. G. Larsson, and T. L. Marzetta, "Cell-free massive MIMO versus small cells," IEEE Trans. Wireless Commun., vol. 16, no. 3, pp. 1834-1850, March 2

SUMMARY OF INVENTION

Technical Problem

However, in a case where the above-described PTP-based time synchronization is applied to an AP, digital circuitry for causing the PTP to work is necessary. This presents a problem of an increase in cost. Furthermore, in the case of using the PTP and the OTDR, it is necessary to perform, on a wireless control unit, an individual setting of the result of path delay measurement. This presents a problem of an increase in cost required for measurement in a case where the measurement is carried out in a situation where a plurality of APs are connected, as in cell-free massive MIMO. The same applies to the techniques disclosed in Patent Literatures 1 and 2.

An example aspect of the present invention has been made in view of the above problems, and an example object thereof is to provide a technique which makes it possible to, in a base station system in which a wireless control unit is connected to a plurality of analog sections via communication cables, compensate for path delays between the wireless control unit and the plurality of analog sections while preventing an increase in cost.

Solution to Problem

A wireless control unit in accordance with an example aspect of the present invention is a wireless control unit of a base station, the wireless control unit being connected, via communication cables, to a plurality of analog sections each of which outputs a downlink signal by radio waves through an antenna, and the wireless control unit includes: a memory configured to store instructions; and at least one processor which executes the instructions to transmit to the plurality of analog sections a first control signal for performing control so as to cause the plurality of analog sections to transition to a loopback mode, transmit to the plurality of analog sections an observation signal for observing delay times in synchronization with an internal clock serving as a reference clock, for each of the plurality of analog sections, count the number of clocks generated from when the observation signal is transmitted to when the observation signal is received, and calculate a path delay based on the number of clocks counted, transmit to the plurality of analog sections a second control signal for canceling the loopback mode of the plurality of analog sections, and transmit a downlink signal at a timing calculated for each of the plurality of analog sections according to the path delay, to a specific one of the plurality of analog sections which corresponds to the timing.

A wireless control unit in accordance with an example aspect of the present invention is a wireless control unit of a base station, the wireless control unit being connected, via communication cables, to a plurality of analog sections each of which outputs a downlink signal by radio waves through an antenna and communicating with the plurality of analog sections by a wavelength division multiplexing (WDM) scheme, and the wireless control unit includes: a memory configured to store instructions; and at least one processor which executes the instructions to transmit to the plurality of analog sections an observation signal for observing delay times in synchronization with an internal clock serving as a reference clock, the observation signal having a first wavelength, for each of the plurality of analog sections, count the number of clocks generated from when the observation signal is transmitted to when the observation signal is received, and calculate a path delay based on the number of clocks counted, and transmit a downlink signal at a timing calculated for each of the plurality of analog sections according to the path delay, to a specific one of the plurality of analog sections which corresponds to the timing, the downlink signal having a second wavelength different from the first wavelength.

A wireless communication method in accordance with an example aspect of the present invention is a wireless communication method carried out by a base station system which includes a wireless control unit and a plurality of analog sections connected to the wireless control unit via communication cables, and the wireless communication method includes: the wireless control unit transmitting to the plurality of analog sections a control signal for performing control so as to cause the plurality of analog sections to transition to a loopback mode; the wireless control unit transmitting to the plurality of analog sections an observation signal for observing delay times in synchronization with an internal clock serving as a reference clock; the wireless control unit counting, for each of the plurality of analog sections, the number of clocks generated from when the observation signal is transmitted to when the observation signal is received, and calculating a path delay based on the number of clocks counted; the wireless control unit transmitting to the plurality of analog sections a control signal for canceling the loopback mode of the plurality of analog sections; the wireless control unit transmitting a downlink signal at a timing calculated for each of the plurality of analog sections according to the path delay, to a specific one of the plurality of analog sections which corresponds to the timing; the plurality of analog sections transitioning to the loopback mode in a case of receiving the control signal for causing a transition to the loopback mode; the plurality of analog sections reproducing, in the loopback mode, a transmission signal from a reception signal received from the wireless control unit, to transmit the transmission signal to the wireless control unit; the plurality of analog sections transitioning to a communication mode in a case of receiving a control signal for canceling the loopback mode; and the plurality of analog sections outputting, in the communication mode, the downlink signal received from the wireless control unit, by radio waves through an antenna.

Advantageous Effects of Invention

With an example aspect of the present invention, it is possible to, in a base station system in which a wireless control unit is connected to a plurality of analog sections via communication cables, compensate for path delays between the wireless control unit and the plurality of analog sections while preventing an increase in cost.

EXAMPLE EMBODIMENTS

First Example Embodiment

The following description will discuss a first example embodiment of the present invention in detail, with reference to the drawings. The present example embodiment is basic to example embodiments which will be described later.

(Configuration of Base Station System)

Figure 1:
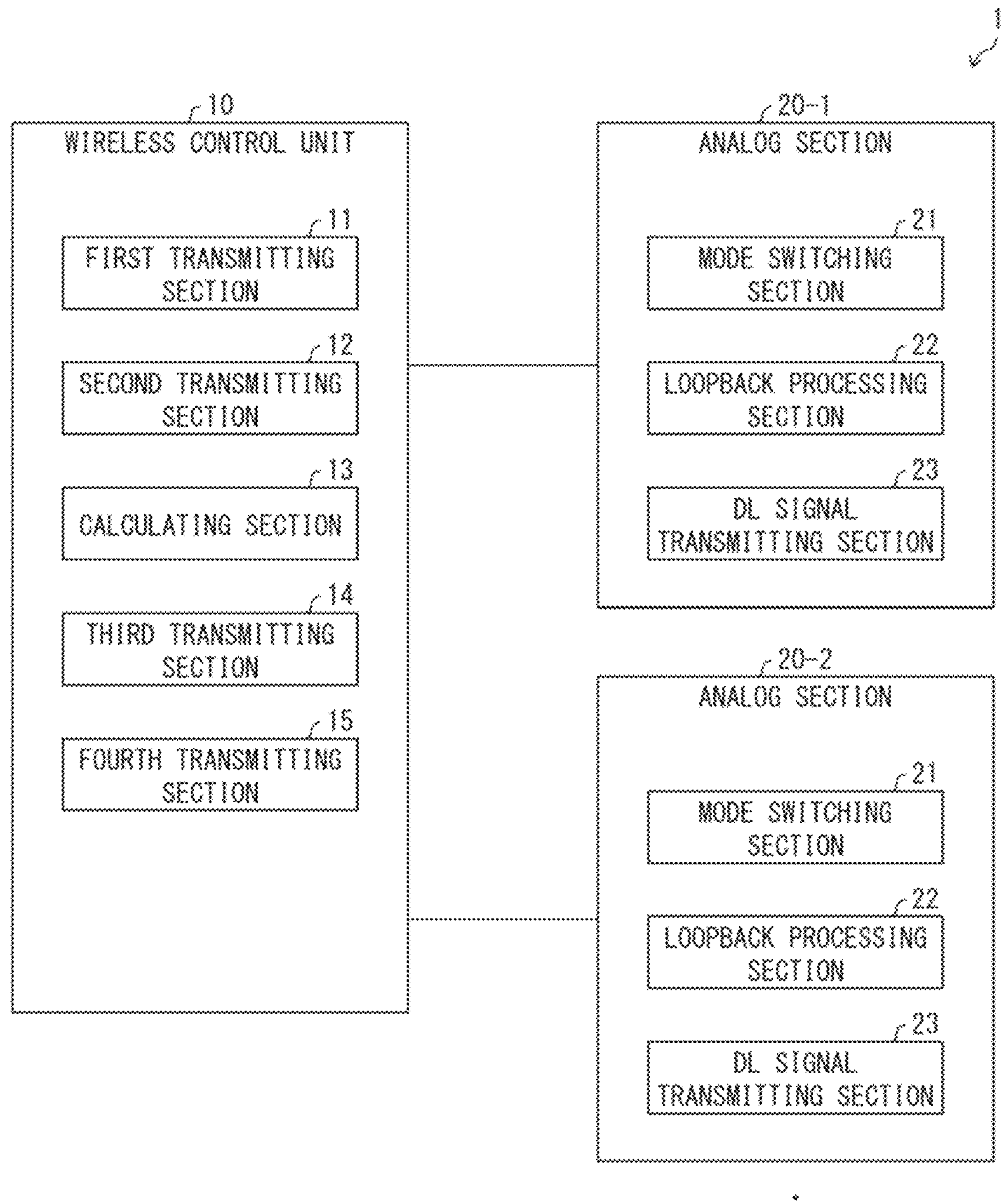
FIG. 1 is a block diagram illustrating a configuration of a base station system in accordance with a first example embodiment.

A configuration of a base station system 1 in accordance with the present example embodiment will be described below with reference to FIG. 1. FIG. 1 is a block diagram illustrating a configuration of the base station system 1. The base station system 1 includes a wireless control unit 10 and a plurality of analog sections 20-1, 20-2, . . . . Each of the plurality of analog sections 20-1, 20-2, . . . is connected to the wireless control unit 10 via communication cables. Examples of the communication cable include, but are not limited to, a fiber-optic cable. In the following description, in a case where the analog sections 20-1, 20-2, . . . do not need to be distinguished from each other, these analog sections are referred to as "analog sections 20".

The wireless control unit 10 includes a first transmitting section 11 (first transmitting means), a second transmitting section 12 (second transmitting means), a calculating section 13 (calculating means), a third transmitting section 14 (third transmitting means), and a fourth transmitting section 15 (fourth transmitting means).

The first transmitting section 11 transmits to the analog sections 20 a control signal for performing control so as to cause the analog sections 20 to transition to a loopback mode. The second transmitting section 12 transmits to the analog sections 20 an observation signal for observing delay times in synchronization with an internal clock serving as a reference clock. For each of the plurality of analog sections 20, the calculating section 13 counts the number of clocks generated from when the observation signal is transmitted to when the observation signal is received, and calculates a path delay based on the number of clocks counted. The third transmitting section 14 transmits to the analog sections 20 a control signal for canceling the loopback mode of the analog sections 20. The fourth transmitting section 15 transmits a downlink signal (DL signal), at a timing calculated for each of the analog sections 20 according to the path delay, to a specific one of the analog sections 20 which corresponds to the timing.

The analog sections 20 each include a mode switching section 21 (mode switching means), a loopback processing section 22 (loopback processing means), and a DL signal transmitting section 23 (downlink signal transmitting means).

The mode switching section 21 transitions to a loopback mode in a case of receiving a control signal for causing a transition to a loopback mode. Further, the mode switching section 21 transitions to a communication mode in a case of receiving a control signal for canceling the loopback mode. In the loopback mode, the loopback processing section 22 reproduces a transmission signal from a reception signal received from the wireless control unit 10, to transmit the transmission signal to the wireless control unit 10. In the communication mode, the DL signal transmitting section 23 outputs, by radio waves through an antenna, the DL signal received from the wireless control unit 10.

As above, the base station system 1 in accordance with the present example embodiment includes a wireless control unit 10 and a plurality of analog sections 20 connected to the wireless control unit 10 via communication cables, the wireless control unit 10 including a first transmitting section 11, a second transmitting section 12, a calculating section 13, a third transmitting section 14, and a fourth transmitting section 15, the first transmitting section 11 being configured to transmit to the analog sections 20 a control signal for performing control so as to cause the analog sections 20 to transition to a loopback mode, the second transmitting section 12 being configured to transmit to the analog sections 20 an observation signal for observing delay times in synchronization with an internal clock serving as a reference clock, the calculating section 13 being configured to, for each of the analog sections 20, count the number of clocks generated from when the observation signal is transmitted to when the observation signal is received, to calculate a path delay based on the number of clocks counted, the third transmitting section 14 being configured to transmit to the analog sections 20 a control signal for canceling the loopback mode of the analog sections 20, the fourth transmitting section 15 being configured to transmit a DL signal at a timing calculated for each of the analog sections 20 according to the path delay, to a specific one of the analog sections 20 which corresponds to the timing, the plurality of analog sections 20 each including a mode switching section 21, a loopback processing section 22, and a DL signal transmitting section 23, the mode switching section 21 being configured to transition to a loopback mode in a case of receiving a control signal for causing a transition to a loopback mode, and transition to a communication mode in a case of receiving a control signal for canceling the loopback mode, the loopback processing section 22 being configured to, in the loopback mode, reproduce a transmission signal from a reception signal received from the wireless control unit 10, to transmit the transmission signal to the wireless control unit 10, the DL signal transmitting section 23 being configured to, in the communication mode, output the downlink signal received from the wireless control unit 10, by radio waves through an antenna. Thus, the base station system 1 in accordance with the present example embodiment provides an example advantage of making it possible, in the base station system 1, in which the wireless control unit 10 is connected to the plurality of analog sections 20 via cables, to compensate for path delays between the wireless control unit 10 and the plurality of analog sections 20 while preventing an increase in cost.

(Flow of Wireless Communication Method)

Figure 2:
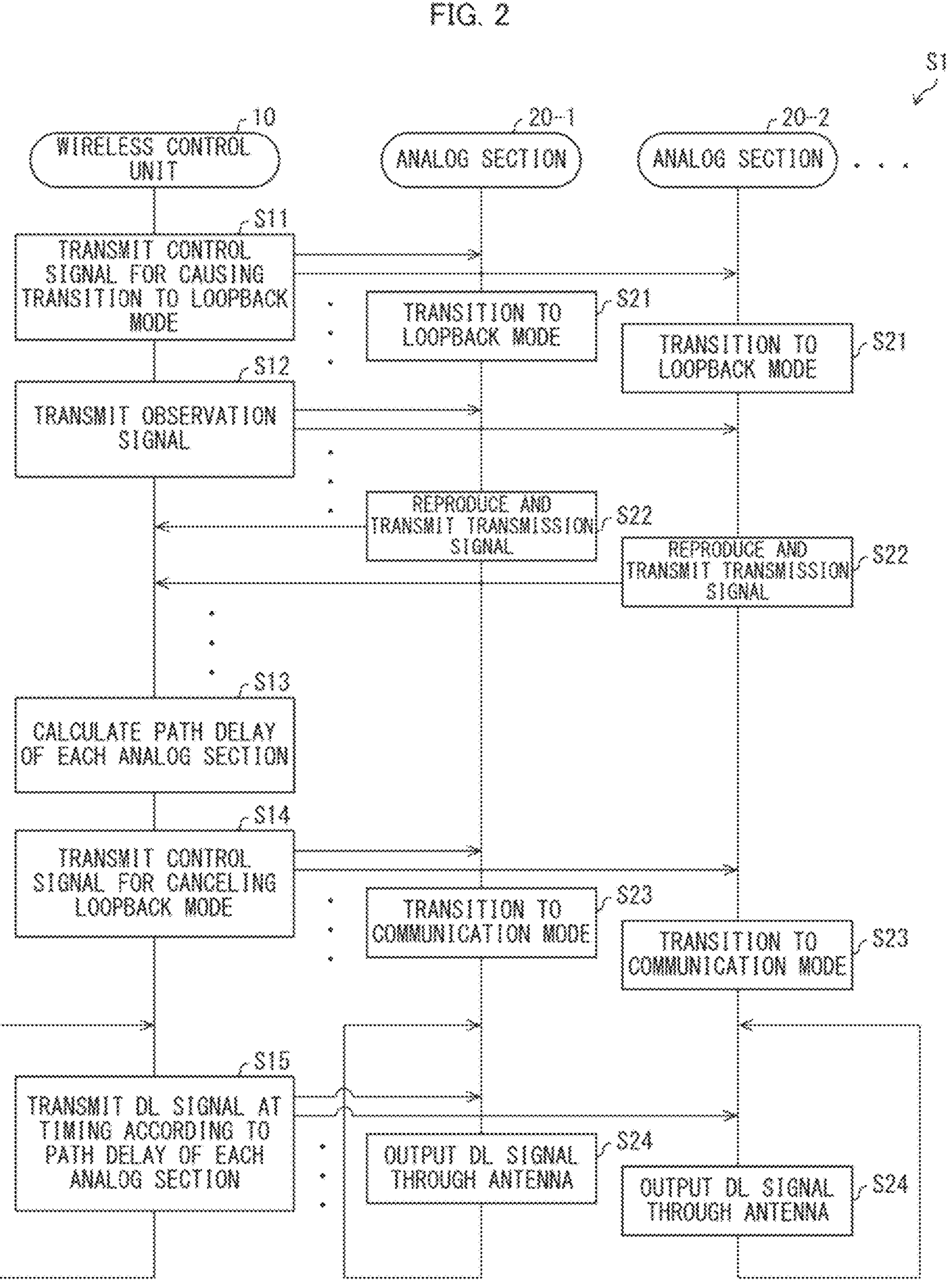
FIG. 2 is a sequence diagram illustrating a flow of a wireless communication method in accordance with the first example embodiment.

A flow of a wireless communication method S1 in accordance with the present example embodiment will be described below with reference to FIG. 2. FIG. 2 is a sequence diagram illustrating a flow of the wireless communication method S1. The wireless communication method S1 is a wireless communication method carried out by the base station system 1, which includes the wireless control unit 10 and the plurality of analog sections 20 connected to the wireless control unit 10 via communication cables.

In S11, the wireless control unit 10 transmits to the analog sections 20 a control signal for performing control so as to cause the analog sections 20 to transition to a loopback mode. In S12, the wireless control unit 10 transmits to the analog sections 20 an observation signal for observing delay times in synchronization with an internal clock serving as a reference clock. In S13, for each of the plurality of analog sections 20, the wireless control unit 10 counts the number of clocks generated from when the observation signal is transmitted to when the observation signal is received, and calculates a path delay based on the number of clocks counted. In S14, the wireless control unit 10 transmits to the analog sections 20 a control signal for canceling the loopback mode of the analog sections 20. In S15, the wireless control unit 10 transmits a DL signal, at a timing calculated for each of the analog sections 20 according to the path delay, to a specific one of the analog sections 20 which corresponds to the timing.

In S21, the analog sections 20 transition to a loopback mode in a case of receiving the control signal for causing a transition to a loopback mode. In S22, in the loopback mode, the analog sections 20 each reproduce a transmission signal from a reception signal received from the wireless control unit 10, to transmit the transmission signal to the wireless control unit 10.

In S23, the analog sections 20 transition to a communication mode in a case of receiving the control signal for canceling a loopback mode. In S24, in the communication mode, the analog sections 20 each output, to an antenna, a DL signal received from the wireless control unit 10.

As above, the wireless communication method S1 in accordance with the present example embodiment is a wireless communication method carried out by a base station system 1 which includes a wireless control unit 10 and a plurality of analog sections 20 connected to the wireless control unit 10 via communication cables, the wireless communication method S1 including: the wireless control unit 10 transmitting to the analog sections 20 a control signal for performing control so as to cause the analog sections to transition to a loopback mode; the wireless control unit 10 transmitting to the analog sections 20 an observation signal for observing delay times in synchronization with an internal clock serving as a reference clock; the wireless control unit 10 counting, for each of the plurality of analog sections 20, the number of clocks generated from when the observation signal is transmitted to when the observation signal is received, and calculating a path delay based on the number of clocks counted; the wireless control unit 10 transmitting to the analog sections 20 a control signal for canceling the loopback mode of the analog sections 20; and the wireless control unit 10 transmitting a DL signal at a timing calculated for each of the analog sections 20 according to the path delay, to a specific one of the analog sections 20 which corresponds to the timing. In addition, the wireless communication method S1 includes: the analog sections 20 transitioning to a loopback mode in a case of receiving the control signal for causing a transition to a loopback mode; the analog sections 20 reproducing, in the loopback mode, a transmission signal from a reception signal received from the wireless control unit 10, to transmit the transmission signal to the wireless control unit 10; the analog sections 20 transitioning to a communication mode in a case of receiving the control signal for canceling the loopback mode; and the analog sections 20 outputting, in the communication mode, a DL signal received from the wireless control unit 10, by radio waves through an antenna. Thus, the wireless communication method S1 in accordance with the present example embodiment provides an example advantage of making it possible to, in the base station system 1 in which the wireless control unit 10 is connected to the plurality of analog sections 20 via communication cables, compensate for path delays between the wireless control unit 10 and the plurality of analog sections 20 while preventing an increase in cost.

(Configuration of Base Station System)

Figure 3:
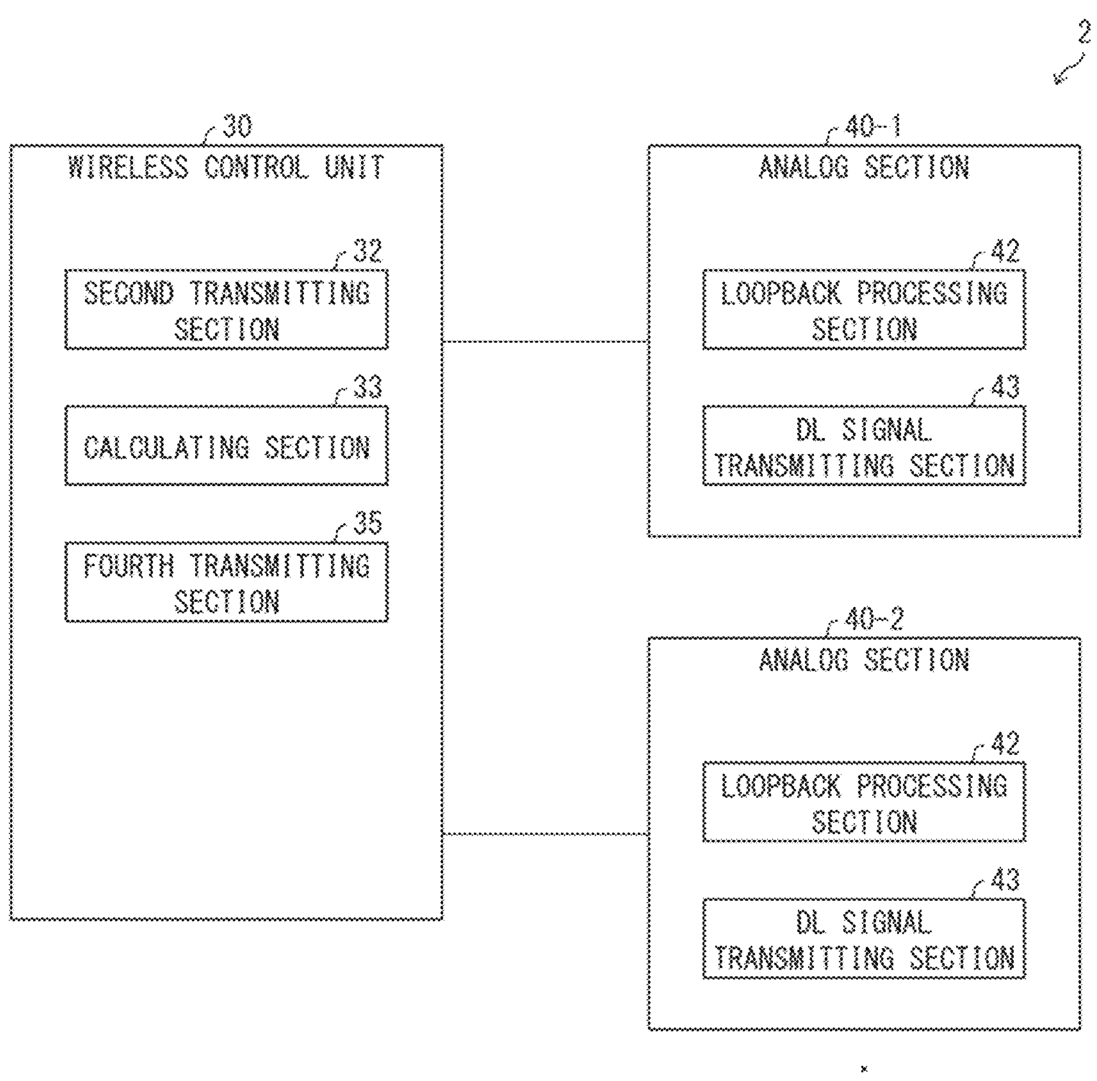
FIG. 3 is a block diagram illustrating a configuration of a base station system in accordance with the first example embodiment.

A configuration of a base station system 2 in accordance with the present example embodiment will be described below with reference to FIG. 3. FIG. 3 is a block diagram illustrating a configuration of the base station system 2. The base station system 2 includes a wireless control unit 30 and a plurality of analog sections 40-1, 40-2, . . . . Each of the plurality of analog sections 40-1, 40-2, . . . is connected to the wireless control unit 30 via a communication cable. The communication cable is, for example, a fiber-optic cable. The wireless control unit 30 and the analog sections 40-1, 40-2, . . . communicate with each other by a wavelength division multiplexing (WDM) scheme. In the following description, in a case where the analog sections 40-1, 40-2, . . . do not need to be distinguished from each other, these analog sections are referred to as "analog sections 40".

The wireless control unit 30 includes a second transmitting section 32 (second transmitting means), a calculating section 33 (calculating means), and a fourth transmitting section 35 (fourth transmitting means). The second transmitting section 32 transmits to the analog sections 40 an observation signal for observing delay times in synchronization with an internal clock serving as a reference clock, the observation signal having a first wavelength. For each of the plurality of analog sections 40, the calculating section 33 counts the number of clocks generated from when the observation signal is transmitted to when the observation signal is received, and calculates a path delay based on the number of clocks counted. The fourth transmitting section 35 transmits a downlink signal (DL signal) at a timing calculated for each of the analog sections 40 according to the path delay, to a specific one of the analog sections 40 which corresponds to the timing, the DL signal having a second wavelength different from the first wavelength.

The analog sections 40 each include a loopback processing section 42 (loopback processing means) and a DL signal transmitting section 43 (downlink signal transmitting means). The loopback processing section 42 reproduces a transmission signal from a reception signal received from the wireless control unit 30, the reception signal having the first wavelength, to transmit the transmission signal to the wireless control unit 30. The DL signal transmitting section 43 outputs, by radio waves through an antenna, the DL signal having the second wavelength and received from the wireless control unit 30.

As above, the base station system 2 in accordance with the present example embodiment is a base station system which includes a wireless control unit 30 and a plurality of analog sections 40 connected to the wireless control unit 30 via communication cables and in which the wireless control unit 30 and the analog sections 40 communicate with each other by a WDM scheme, the wireless control unit 30 including a second transmitting section 32, a calculating section 33, and a fourth transmitting section 35, the second transmitting section 32 being configured to transmit an observation signal for observing delay times in synchronization with an internal clock serving as a reference clock, the observation signal having a first wavelength, the calculating section 33 being configured to, for each of the plurality of analog sections 40, count the number of clocks generated from when the observation signal transmitted is to when the observation signal is received, and calculate a path delay based on the number of clocks counted, the fourth transmitting section 35 being configured to transmit a DL signal at a timing calculated for each of the analog sections 40 according to the path delay, to a specific one of the analog sections 40 which corresponds to the timing, the DL signal having a second wavelength different from the first wavelength, the plurality of analog sections 40 each including a loopback processing section 42 and a DL signal transmitting section 43, the loopback processing section 42 being configured to reproduce a transmission signal from a reception signal having the first wavelength and received from the wireless control unit 30, to transmit the transmission signal to the wireless control unit 30, the DL signal transmitting section 43 being configured to output, by radio waves through an antenna, the downlink signal having the second wavelength and received from the wireless control unit 30. Thus, the base station system 2 in accordance with the present example embodiment provides an example advantage of making it possible, in the base station system 2, in which the wireless control unit 30 is connected to the plurality of analog sections 40 via cables, to compensate for path delays between the wireless control unit 30 and the plurality of analog sections 40 while preventing an increase in cost.

(Flow of Wireless Communication Method)

Figure 4:
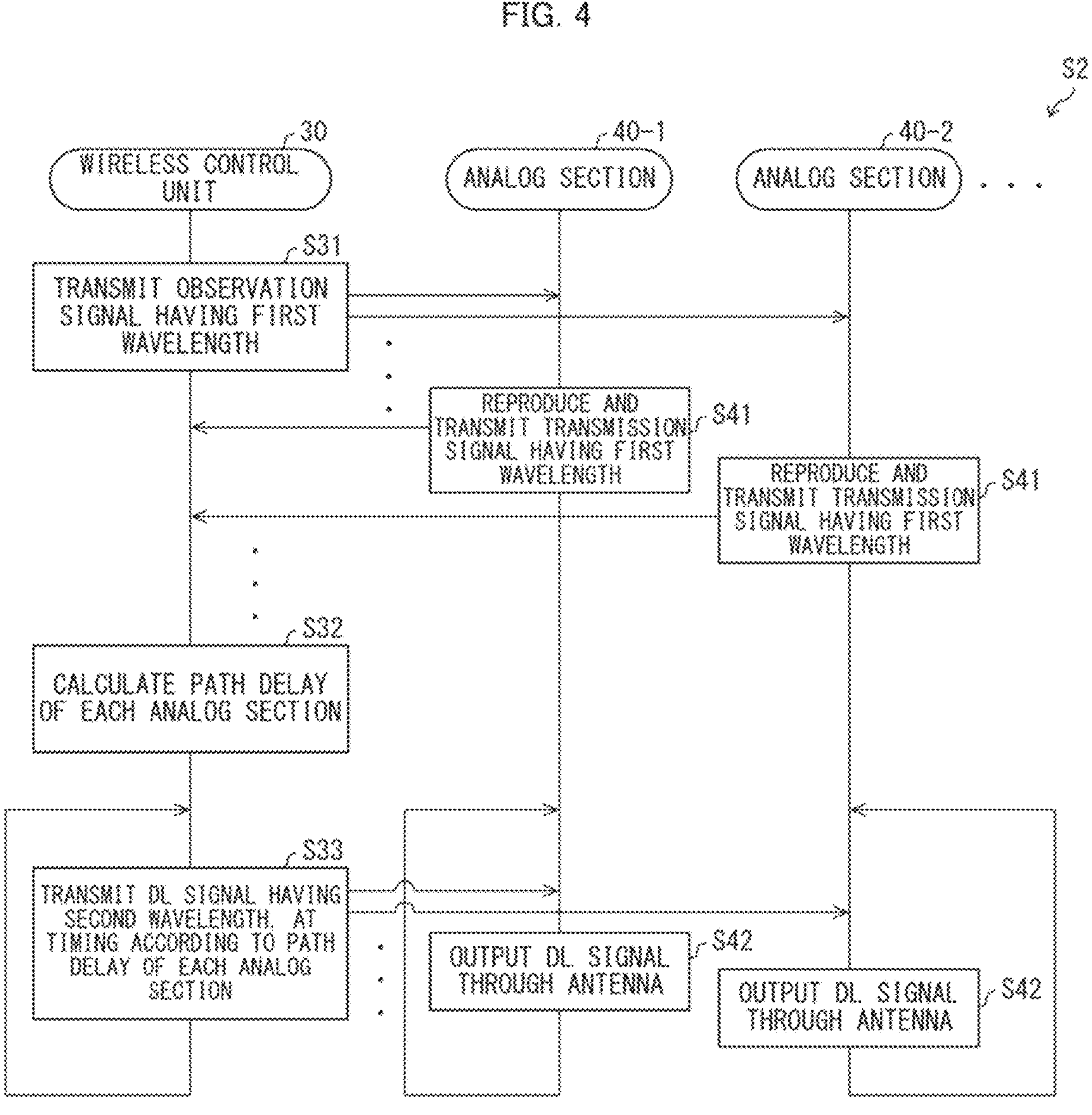
FIG. 4 is a sequence diagram illustrating a flow of a wireless communication method in accordance with the first example embodiment.

A flow of a wireless communication method S2 in accordance with the present example embodiment will be described below with reference to FIG. 4. FIG. 4 is a sequence diagram illustrating a flow of the wireless communication method S2. The wireless communication method S2 is a wireless communication method carried out by the base station system 2, which has the wireless control unit 30 and the plurality of analog sections 40 connected to the wireless control unit 30 via communication cables. The wireless control unit 30 and the analog sections 40 communicate with each other by a WDM scheme.

In S31, the wireless control unit 30 transmits to the analog sections 40 an observation signal for observing delay times in synchronization with an internal clock serving as a reference clock, the observation signal having a first wavelength. In S32, for each of the plurality of analog sections 40, the wireless control unit 30 counts the number of clocks generated from when the observation signal is transmitted to when the observation signal is received, and calculates a path delay based on the number of clocks counted. In S33, the wireless control unit 30 transmits a DL signal at a timing calculated for each of the analog sections 40 according to the path delay, to a specific one of the analog sections 40 which corresponds to the timing, the DL signal having a second wavelength different from the first wavelength.

In S41, the analog sections 40 each reproduce a transmission signal from a reception signal having the first wavelength and received from the wireless control unit 30, to transmit the transmission signal to the wireless control unit 30. In S42, the analog sections 40 each output, to an antenna, the DL signal having the second wavelength and received from the wireless control unit 30.

As above, the wireless communication method S2 in accordance with the present example embodiment is a wireless communication method carried out by a base station system 2 which includes a wireless control unit 30 and a plurality of analog sections 40 connected to the wireless control unit 30 via communication cables and in which the wireless control unit 30 and the analog sections 40 communicate with each other by a WDM scheme, the wireless communication method S2 including: the wireless control unit 30 transmitting an observation signal for observing delay times in synchronization with an internal clock serving as a reference clock, the observation signal having a first wavelength; the wireless control unit 30 counting, for each of the plurality of analog sections 40, the number of clocks generated from when the observation signal is transmitted to when the observation signal is received, and calculating a path delay based on the number of clocks counted; the wireless control unit 30 transmitting a DL signal at a timing calculated for each of the analog sections 40 according to the path delay, to a specific one of the analog sections 40 which corresponds to the timing, the DL signal having a second wavelength different from the first wavelength. In addition, the wireless communication method S2 includes: the analog sections 40 each reproducing a transmission signal from a reception signal received from the wireless control unit 30, the reception signal having the first wavelength, to transmit the transmission signal to the wireless control unit 30; and the analog sections 40 each outputting, by radio waves through an antenna, a DL signal having the second wavelength and received from the wireless control unit 30. Thus, the wireless communication method S2 in accordance with the present example embodiment provides an example advantage of making it possible to, in the base station system 2 in which the wireless control unit 30 is connected to the plurality of analog sections 40 via communication cables, compensate for path delays between the wireless control unit 30 and the plurality of analog sections 40 while preventing an increase in cost.

Second Example Embodiment (Configuration of Base Station System)

Figure 5:
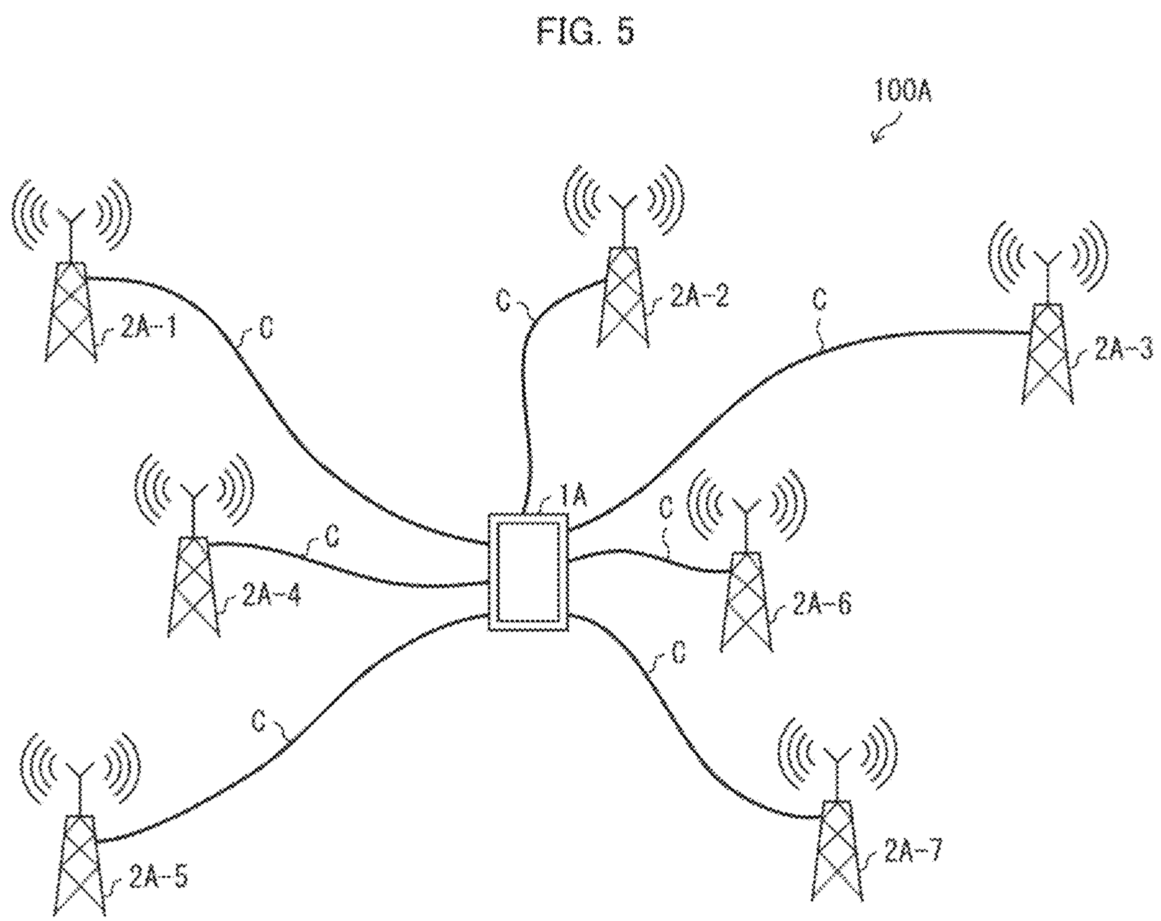
FIG. 5 is a schematic diagram illustrating a configuration of a base station system in accordance with a second example embodiment.

The following description will discuss a second example embodiment of the present invention in detail, with reference to the drawings. FIG. 5 is a schematic diagram illustrating a configuration of a base station system 100A in accordance with the present example embodiment. The base station system 100A includes a wireless control unit 1A and a plurality of analog sections 2A-1, 2A-2, . . . . The wireless control unit 1A and the analog sections 2A are compositions separate from each other, and the wireless control unit 1A and the analog sections 2A are connected together via communication cables C. According to the present example embodiment, the communication cables C are fiber-optic cables. In the following description, in a case where the analog sections 2A-1, 2A-2, . . . do not need to be distinguished from each other, these analog sections are referred to as "analog sections 2A".

The wireless control unit 1A is a unit which carries out digital signal processing, and is, for example, a broad band unit (BBU). The wireless control unit 1A may be, for example, a radio unit (RU) or a distributed unit (DU) in the 5G. In other words, the functions of the wireless control unit 1A may be incorporated in the RU or DU. Each of the analog sections 2A is a unit which transmits and receives a wireless signal to and from a terminal through an antenna, and is, for example, an access point.

As illustrated in FIG. 5, in the base station system 100A, the length of a communication cable C which connects the wireless control unit 1A and an analog section 2A varies according to the placement location of the analog section 2A. This variation causes variation among the plurality of analog sections 2A in the timing at which a DL signal is transmitted. The base station system 100A compensates for path delays due to such variation, to transmit the DL signal.

(Configuration of Wireless Control Unit)

Figure 6:
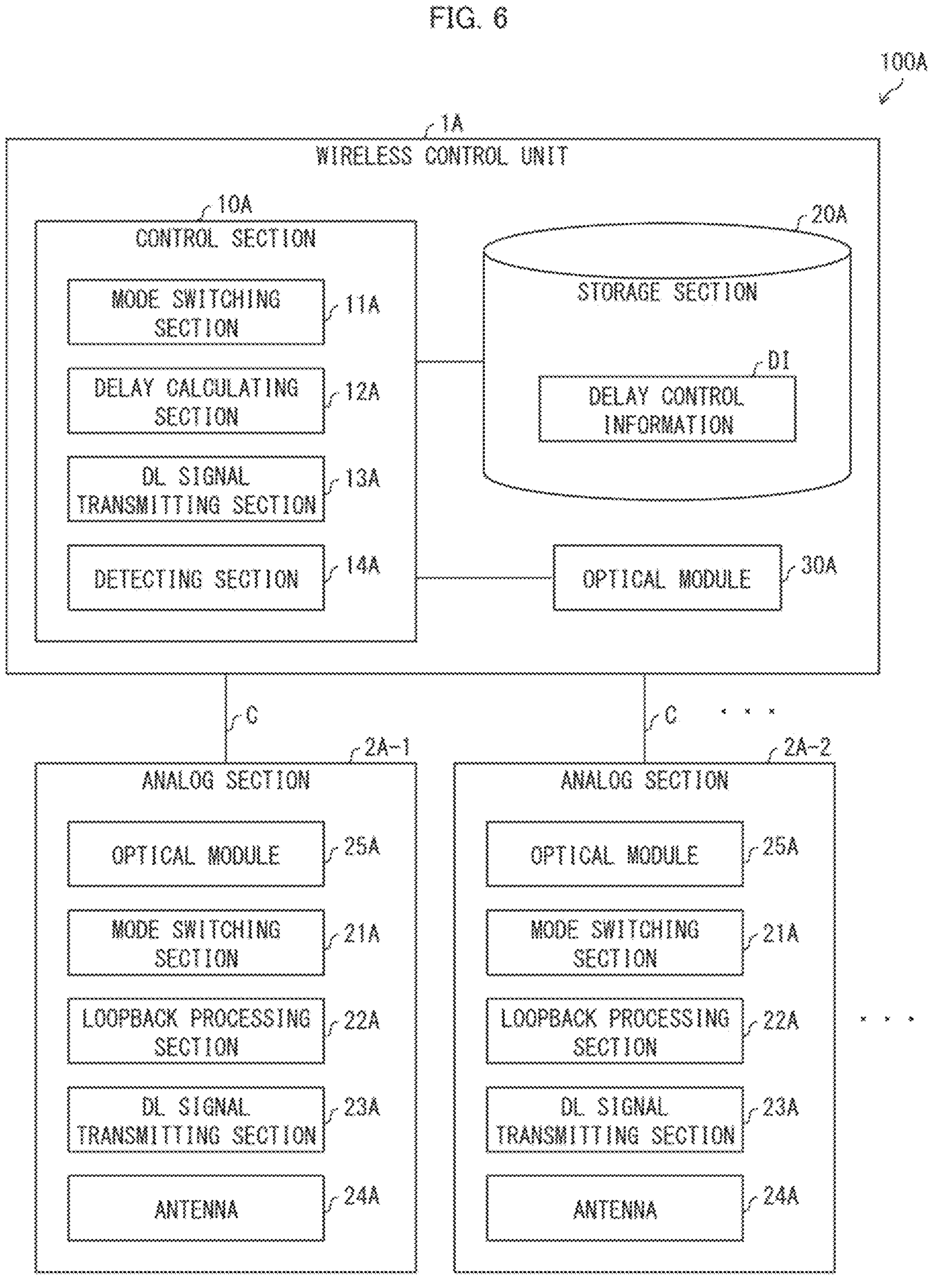
FIG. 6 is a block diagram illustrating an example of configurations of a wireless control unit and analog sections in accordance with the second example embodiment.

FIG. 6 is a block diagram illustrating an example of configurations of the wireless control unit 1A and the analog sections 2A. The wireless control unit 1A include a control section 10A, a storage section 20A, and an optical module 30A. The storage section 20A stores information referred to at the time when the control section 10A (described later) transmits a DL signal. In particular, the storage section 20A stores delay control information DI which indicates a path delay calculated by a delay calculating section 12A (described later) for each of the analog sections 2A.

The optical module 30A converts an electronic signal into an optical signal, and transmits the optical signal to the analog sections 2A via the communication cables C. Further, the optical module 30A converts an optical signal received via the communication cables C, into an electronic signal. In the example illustrated in FIG. 6, the wireless control unit 1A includes the optical module 30A. However, the optical module 30A may be installed so as to be external to the wireless control unit 1A.

The control section 10A includes a mode switching section 11A, a delay calculating section 12A, a DL signal transmitting section 13A, and a detecting section 14A. The mode switching section 11A is an example of the first transmitting means and the third transmitting means in accordance with the present specification. The delay calculating section 12A is an example of the second transmitting means and the calculating means in accordance with the present specification. The DL signal transmitting section 13A is an example of the fourth transmitting means in accordance with the present specification. The detecting section 14A is an example of the detecting means in accordance with the present specification.

The mode switching section 11A generates a control signal for performing control so as to cause the analog sections 2A to transition to a loopback mode, and outputs the control signal to the optical module 30A. The optical module 30A converts the control signal to an optical signal, and outputs the optical signal to the communication cables C. As an example, in a case where a deterioration of the optical module 30A of the wireless control unit 1A or an optical module 25A of the analog sections 2A is detected by the detecting section 14A (described later), the mode switching section 11A transmits, via the optical module 30A, a control signal for performing control so as to cause the analog sections 2A to transition to a loopback mode.

In addition, after the delay calculating section 12A (described later) calculates a path delay for each of the analog sections 2A, the mode switching section 11A transmits to the analog sections 2A a control signal for canceling the loopback mode of the analog sections 2A.

The delay calculating section 12A transmits to the analog sections 2A an observation signal for observing delay in synchronization with an internal clock serving as a reference clock. In addition, the delay calculating section 12A receives an observation signal transmitted from the analog sections 2A by a loopback function of the analog sections 2A. As an example, the observation signal may be a signal which indicates a transmission time. Further, the observation signal may be, for example, a signal having a predetermined frame pattern.

For each of the plurality of analog sections 2A, the delay calculating section 12A counts the number of clocks generated from when an observation signal is transmitted to when the observation signal is received. Further, for each of the analog sections 2A, the delay calculating section 12A calculates a path delay based on the number of clocks counted. More specifically, for example, the delay calculating section 12A may transmit an observation signal which indicates a transmission time, and measure a path delay with use of the difference between the reception time of the observation signal and the transmission time. In this respect, the circuitry for counting the number of clocks may be formed as dedicated circuitry, or some of the functions used for the above-described PTP may also be used for the circuitry.

The DL signal transmitting section 13A transmits, through the optical module 30A, a DL signal at a timing calculated for each of the analog sections 2A according to the path delay above, to a specific one of the analog sections 2A which corresponds to the timing. The optical module 30A converts the DL signal into an optical signal, and outputs the optical signal to the communication cables C. In this transmission, the DL signal transmitting section 13A transmits to each of the analog sections 2A the DL signal at a timing earlier by the path delay time calculated for that analog section 2A.

Figure 7:
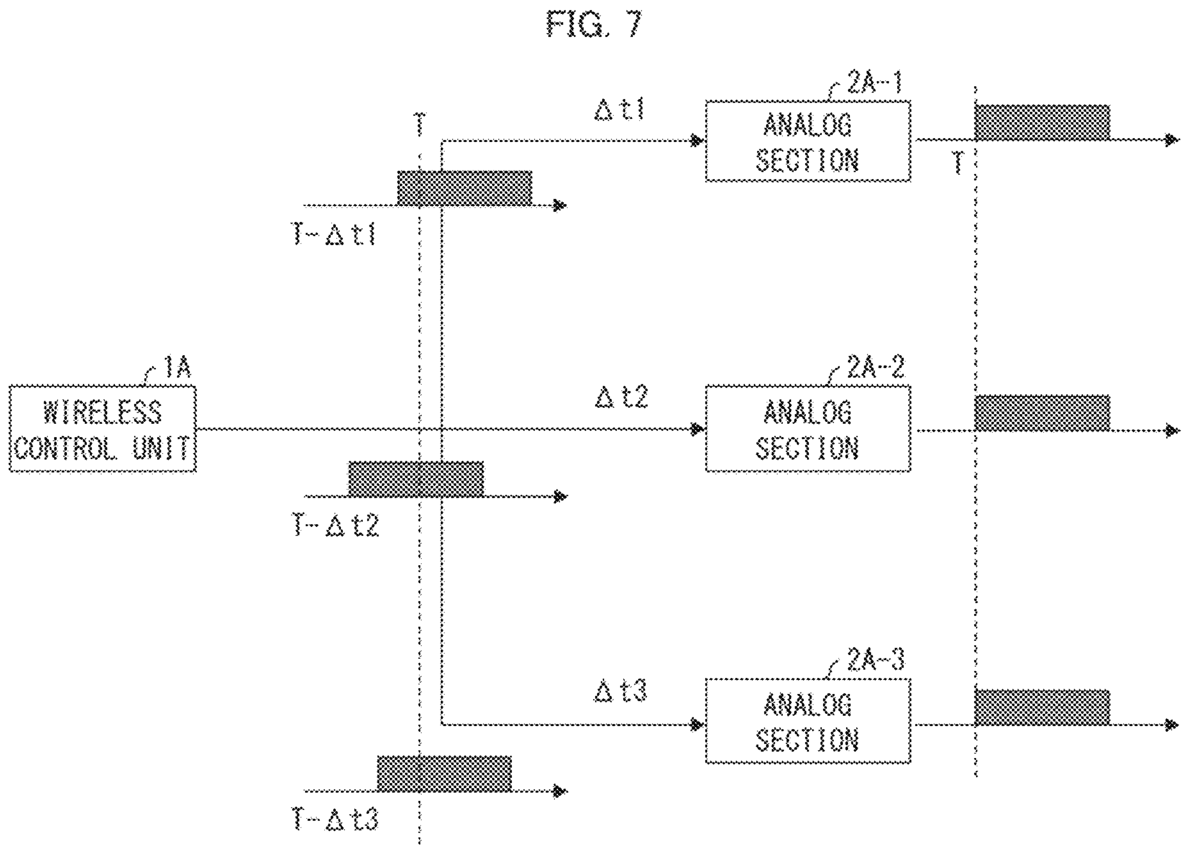
FIG. 7 is a diagram illustrating specific example of timings at which the wireless control unit in accordance with the second example embodiment transmits a DL signal.

FIG. 7 is a diagram illustrating specific example of timings at which the wireless control unit 1A transmits a DL signal. In the example illustrated in FIG. 7, respective path delays calculated by the delay calculating section 12A for three analog sections 2A-1, 2A-2, and 2A-3 are Δt1, Δt2, and Δt3. In this case, the DL signal transmitting section 13A transmits the DL signal to the analog section 2A-1 at the time (T−Δt1), transmits the DL signal to the analog section 2A-2 at the time (T−Δt2), and transmits the DL signal to the analog section 2A-3 at the time (T−Δt3).

The detecting section 14A detects a deterioration of the optical module 30A of the wireless control unit 1A or the optical module 25A of the analog sections 2A. As a method whereby the detecting section 14A detects a deterioration of the optical module, commonly used methods can be applied. In the examples illustrated in FIG. 6, the wireless control unit 1A includes the detecting section 14A. However, the detecting section 14A may be included another apparatus which is not the wireless control unit 1A. In this case, the other apparatus including the detecting section 14A notifies the wireless control unit 1A of the detection of a deterioration of the optical module.

(Configuration of Analog Sections)

Each of the analog sections 2A includes a mode switching section 21A, a loopback processing section 22A, a DL signal transmitting section 23A, an antenna 24A, and an optical module 25A. The optical module 25A converts an electronic signal into an optical signal, and transmits the optical signal to the wireless control unit 1A via the corresponding communication cable C. Further, the optical module 25A converts an optical signal received via the corresponding communication cable C, into an electronic signal. In the example illustrated in FIG. 6, the analog sections 2A includes the optical modules 25A. However, the optical modules 25A may be installed so as to be external to the analog sections 2A.

According to the present example embodiment, for example, the loopback processing section 22A and the DL signal transmitting section 23A are each formed by discrete hardware circuitry. Further, in a case where the optical module 25A is a small form-factor pluggable (SFP) module, the loopback function incorporated in the SFP module may be used as the loopback processing section 22A.

The mode switching section 21A switches between a communication mode and a loopback mode. The communication mode is a mode in which regular communication is conducted. In the communication mode, the analog sections 2A output, by radio waves through the antennas 24A, a DL signal received from the wireless control unit 1A. On the other hand, the loopback mode is a mode in which the analog sections 2A reproduce a transmission signal from a reception signal received from the wireless control unit 1A, to transmit the transmission signal to the wireless control unit 1A. The loopback mode is used for calculating path delays between the wireless control unit 1A and the analog sections 2A.

As an example, the mode switching section 21A may be control circuitry which electrically switches circuitry in response to an instruction from the wireless control unit 1A. In this case, the control circuitry is formed by circuitry such as a microcomputer, which implements a simple protocol. In this case, upon reception of a signal which has a particular frequency, the mode switching section 21A sets, to a high or a low, an input voltage of a transistor for switching the switch of the circuitry, and keeps the setting.

In the loopback mode, the loopback processing section 22A reproduces a transmission signal from a reception signal received from the wireless control unit 1A, to transmit the transmission signal to the wireless control unit 1A. The DL signal transmitting section 23A outputs, by radio waves through the antenna 24A, the DL signal received from the wireless control unit 1A in the communication mode.

In the example illustrated in FIG. 7, the DL signal transmitted by the wireless control unit 1A to the analog section 2A-1 at the time (T−Δt1) reaches the analog section 2A-1 at the time T as a result of the delay Δt1 caused by the communication cable C which connects the wireless control unit 1A to the analog section 2A-1, and is outputted by radio waves through the antenna 24A of the analog section 2A-1. The DL signal transmitted by the wireless control unit 1A to the analog section 2A-2 at the time (T−Δt2) reaches the analog section 2A-2 at the time T as a result of the delay Δt2 caused by the communication cable C which connects the wireless control unit 1A to the analog section 2A-2, and is outputted by radio waves through the antenna 24A of the analog section 2A-2. The DL signal transmitted by the wireless control unit 1A to the analog section 2A-3 at the time (T−Δt3) reaches the analog section 2A-3 at the time T as a result of the delay Δt3 caused by the communication cable C which connects the wireless control unit 1A to the analog section 2A-3, and is outputted by radio waves through the antenna 24A of the analog section 2A-3. Thus, the wireless control unit 1A transmits the DL signal at a timing calculated for each of the analog sections 2A according to a path delay, to that analog section 2A, which corresponds to the timing. This makes it possible to compensate for path delays between the wireless control unit 1A and the plurality of analog sections 2A in the base station system 100A.

(Flow of Processes Carried Out by Wireless Control Unit)

Figure 8:
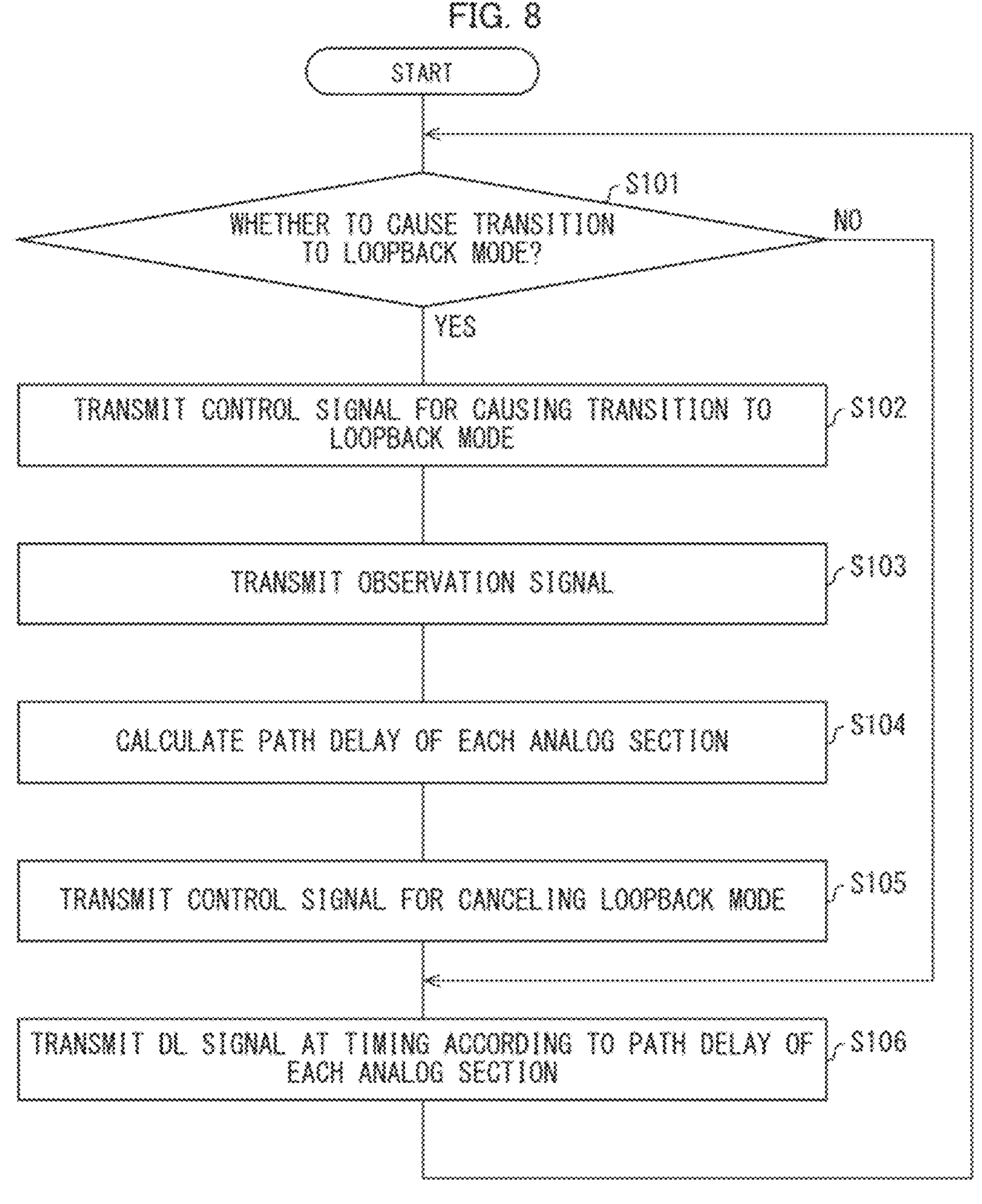
FIG. 8 is a flowchart illustrating an example of a flow of processes carried out by the wireless control unit in accordance with the second example embodiment.

A flow of the processes carried out by the wireless control unit 1A in accordance with the present example embodiment will be described below with reference to FIG. 8. FIG. 8 is a flowchart illustrating an example of a flow of processes carried out by the wireless control unit 1A.

In step S101, the mode switching section 11A determines whether to perform control so as to cause the analog sections 2A to transition to a loopback mode. For example, before the base station system 100A is brought into operation, at the time of newly setting up the wireless control unit 1A and/or the analog sections 2A, the mode switching section 11A may determine that the analog sections 2A should be controlled so as to transition to a loopback mode. It should be noted that as used herein, the meaning of "A and/or B" includes (i) both A and B, (ii) A, and (iii) B. As another example, during the operation of the base station system 100A, at the time of replacing or repairing the wireless control unit 1A and/or the analog sections 2A, the mode switching section 11A may determine that the analog sections 2A should be controlled so as to transition to a loopback mode. As still another example, during the operation of the base station system 100A, in a case where a deterioration(s) of the wireless control unit 1A and/or the analog sections 2A is/are detected, the mode switching section 11A may determine that the analog sections 2A should be controlled so as to transition to a loopback mode. In particular, in a case where a deterioration of the optical module 30A of the wireless control unit 1A or the optical module 25A of the analog sections 2A is detected, the mode switching section 11A may determine that the analog sections 2A should be controlled so as to transition to a loopback mode.

A method whereby the wireless control unit 1A determines whether to perform control so as to cause the analog sections 2A to transition to a loopback mode is not limited to the above examples. For example, during the operation of the base station system 100A, the mode switching section 11A may cause the analog sections 2A to transition to a loopback mode on a regular basis.

In step S102, the mode switching section 11A transmits to the analog sections 2A a control signal for performing control so as to cause the analog sections 2A to transition to a loopback mode.

In step S103, the delay calculating section 12A transmits to the analog sections 2A an observation signal for observing delay times in synchronization with an internal clock serving as a reference clock. Further, in step S104, the delay calculating section 12A counts the number of clocks generated from when the observation signal is transmitted in step S103 to when the observation signal is received, and calculates a path delay based on the number of clocks counted. The delay calculating section 12A stores, in the storage section 20A, information for compensating for a delay according to the path delay calculated for each of the analog sections 2A. The information is delay control information DI. As an example, the delay control information DI contains information which indicates a path delay.

In step S105, the mode switching section 11A transmits to the analog sections 2A a control signal for canceling the loopback mode of the analog sections 2A. In step S106, the DL signal transmitting section 13A transmits a DL signal at a timing calculated for each of the analog sections 2A according to the path delay, to that analog section 2A, which corresponds to the timing.

(Flow of Processes Carried Out by Analog Sections)

Figure 9:
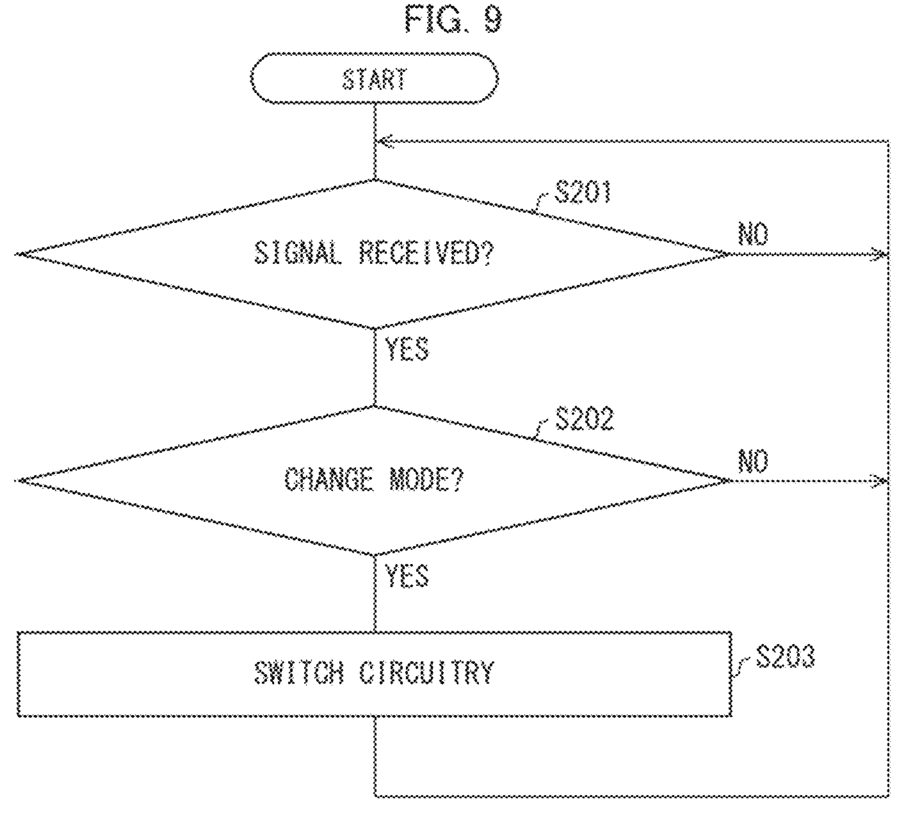
FIG. 9 is a flowchart illustrating an example of a flow of processes carried out by a mode switching section of the analog sections in accordance with the second example embodiment.

FIG. 9 is a flowchart illustrating an example of a flow of processes carried out by the mode switching section 21A of each of the analog sections 2A. In step S201, upon reception of a signal from the wireless control unit 1A via the corresponding communication cable C (YES in step S201), the mode switching section 21A proceeds the process of step S202.

In step S202, the mode switching section 21A determines whether the signal received is a control signal for mode switching. In a case where the signal received is a control signal for mode switching (YES in step S202), the mode switching section 21A proceeds to the process of step S203. In a case where the signal received is not a control signal for mode switching (NO in step S202), the mode switching section 21A returns to the process of step S201 without carrying out the process of step S203.

(Example Advantage of Base Station System)

As described above, according to the present example embodiment, the base station system 100A includes the analog sections 2A each having loopback circuitry (loopback processing section 22A) and the wireless control unit 1A, and the wireless control unit 1A measures times required for transmissions between the analog sections 2A and the wireless control unit 1A on the basis of signals looped back in the analog sections 2A, and adjusts, in accordance with the measured times required for the transmissions, the timings of transmissions of the DL signal from the wireless control unit 1A to the analog sections 2A. By, for each of the analog sections 2A, making earlier the timing of transmission of data from the wireless control unit 1A to that analog section 2A by the delay time calculated for that analog section 2A, it is possible to arrange the timings of transmissions of a wireless signal from the plurality of analog sections 2A such that the transmissions coincide with each other.

According to the present example embodiment, by providing the analog sections 2A with a loopback mode, it is possible to measure, via the wireless control unit 1A, path delays between the wireless control unit 1A and the analog sections 2A, without introducing expensive digital circuitry into the analog sections 2A. In addition, since the path delays are measured inside the wireless control unit 1A, it is possible to carry out a setting of timing adjustment for each of the analog sections 2A without the need for manual work.

Further, in the base station system 100A in accordance with the present example embodiment, the wireless control unit 1A and the analog sections 2A are connected together via fiber-optic cables, and in a case where a deterioration of the optical module 30A of the wireless control unit 1A or the optical module 25A of the analog sections 2A is detected, the mode switching section 11A transmits a control signal for performing control so as to cause the analog sections 2A to transition to a loopback mode. Thus, with the base station system 100A in accordance with the present example embodiment, it is possible to compensate for the path delays between the wireless control unit 1A and the plurality of analog sections 2A, even in a case where the path delays between the wireless control unit 1A and the analog sections 2A change due to a deterioration of the optical module.

Third Example Embodiment

Figure 10:
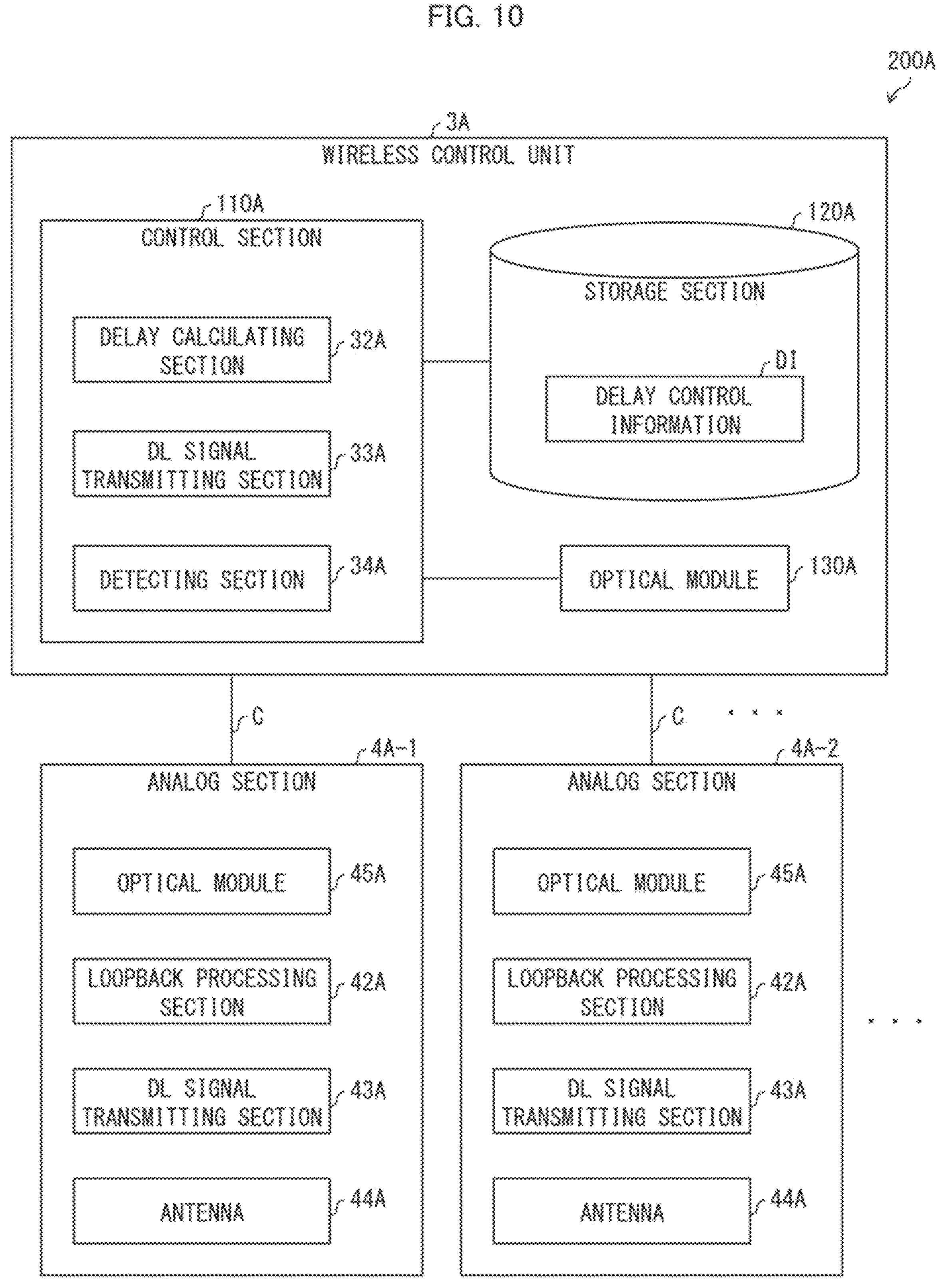
FIG. 10 is a block diagram illustrating a configuration of a base station system in accordance with a third example embodiment.

The following description will discuss a third example embodiment of the present invention in detail, with reference to the drawings. FIG. 10 is a block diagram illustrating a configuration of a base station system 200A in accordance with the third example embodiment. The base station system 200A includes a wireless control unit 3A and a plurality of analog sections 4A-1, 4*a*-2, . . . . The wireless control unit 3A and the analog sections 4A are compositions separate from each other, and the wireless control unit 3A and the analog sections 4A are connected together via communication cables C. According to the present example embodiment, the communication cables C are fiber-optic cables. In the following description, in a case where the analog sections 4A-1, 4A-2, . . . do not need to be distinguished from each other, these analog sections are referred to as “analog sections 4A”.

The wireless control unit 3A and the analog sections 4A communicate with each other by a wavelength division multiplexing (WDM) scheme. WDM is a high-speed, high-capacity information communication means which relies on a fiber-optic cable carrying two or more optical signals of different wavelengths at the same time. According to the present example embodiment, the wireless control unit 3A and the analog sections 4A transmit or receive an observation signal for calculating path delays, the observation signal having a first wavelength, and transmit or receive a DL signal having a second wavelength different from the first wavelength.

The wireless control unit 3A is a unit which carries out digital signal processing, and is, for example, a broad band unit (BBU). As an example, the wireless control unit 3A may be the RU or DU in the 5G. In other words, the functions of the wireless control unit 3A may be incorporated in the RU or DU. Each of the analog sections 4A is a unit which transmits and receives a wireless signal to and from a terminal through an antenna, and is, for example, an access point.

The wireless control unit 3A includes a control section 110A, a storage section 120A, and an optical module 130A, as illustrated in FIG. 10. In the storage section 120A, information referred to at the time when the control section 110A (described later) transmits a DL signal is stored. In particular, delay control information DI is stored in the storage section 120A, the delay control information DI indicating a path delay calculated by a delay calculating section 32A (described later) for each of the analog sections 4A.

The optical module 130A converts an electronic signal into an optical signal, and transmits the optical signal to the analog sections 4A via the communication cables C. Further, the optical module 130A converts an optical received signal via the communication cables C, into an electronic signal. In the example illustrated in FIG. 10, the wireless control unit 3A includes the optical module 130A. However, the optical module 130A may be installed so as to be external to the wireless control unit 3A.

The control section 110A includes a delay calculating section 32A, a DL signal transmitting section 33A, and a detecting section 34A. The delay calculating section 32A is an example of the second transmitting means and the calculating means in accordance with the present specification. The DL signal transmitting section 33A is an example of the fourth transmitting means in accordance with the present specification. The detecting section 34A is an example of the detecting means in accordance with the present specification.

The delay calculating section 32A generates an observation signal for observing delay times in synchronization with an internal clock serving as a reference clock, to output the observation signal to the optical module 130A. The optical module 130A converts the observation signal having a first wavelength to an optical signal, and outputs the optical signal to the communication cables C. As an example, in a case where a deterioration of the optical module 130A of the wireless control unit 3A or an optical module 45A of the analog sections 4A is detected by, for example, the detecting section 34A (described later), the delay calculating section 32A transmits the observation signal to the analog sections 4A through the optical module 130A. As an example, the observation signal may be a signal which indicates a transmission time. Further, the observation signal may be, for example, a signal having a predetermined frame pattern.

In addition, the delay calculating section 32A receives, through the optical module 130A, an observation signal transmitted from the analog sections 4A by a loopback function of the analog sections 4A. In this case, the optical module 130A converts, into an observation signal, an optical signal having a first wavelength and received via the communication cables C, and outputs the observation signal to the delay calculating section 32A.

For each of the plurality of analog sections 4A, the delay calculating section 32A counts the number of clocks generated from when an observation signal is transmitted to when the observation signal is received. Further, for each of the analog sections 4A, the delay calculating section 32A calculates a path delay based on the number of clocks counted.

The DL signal transmitting section 33A transmits, through the optical module 130A, a DL signal at a timing calculated for each of the analog sections 4A according to the path delay above, to a specific one of the analog sections 4A which corresponds to the timing. The optical module 130A converts the DL signal into an optical signal having a second wavelength different from the first wavelength, and outputs the optical signal to the communication cables C.

The detecting section 34A detects a deterioration of the optical module 130A of the wireless control unit 3A or the optical module 45A of the analog sections 4A. In the examples illustrated in FIG. 10, the wireless control unit 3A includes the detecting section 34A. However, the detecting section 34A may be included another apparatus which is not the wireless control unit 3A. In this case, the other apparatus including the detecting section 34A notifies the wireless control unit 3A of the detection of a deterioration of the optical module.

(Configuration of Analog Sections)

The analog sections 4A each include a loopback processing section 42A, a DL signal transmitting section 43A, an antenna 44A, and the optical module 45A. The optical module 45A converts an electronic signal into an optical signal, and transmits the optical signal to the wireless control unit 3A via the corresponding communication cable C. Further, the optical module 45A converts an optical signal received via the corresponding communication cable C, into an electronic signal. In the example illustrated in FIG. 10, the analog sections 4A includes the optical modules 45A. However, the optical modules 45A may be installed so as to be external to the analog sections 4A.

The loopback processing section 42A and the DL signal transmitting section 43A are each formed by discrete hardware circuitry. Further, in a case where the optical module 45A is a small form-factor pluggable (SFP) module, the loopback function incorporated in the SFP module may be used as the loopback processing section 42A.

The optical module 45A isolates an optical signal having a specific wavelength from optical signals received via the communication cables C, to convert the optical signal into an electronic signal. According to the present example embodiment, the optical module 45A outputs, to the loopback processing section 42A, an observation signal transmitted so as to have a first wavelength. In addition, the optical module 45A outputs, to the DL signal transmitting section 43A, a DL signal transmitted so as to have a second wavelength.

The loopback processing section 42A reproduces a transmission signal from a reception signal received from the wireless control unit 3A, the reception signal having a first wavelength, to transmit the transmission signal having the first wavelength, to the wireless control unit 3A via the optical module 45A. In addition, the DL signal transmitting section 43A outputs, by radio waves through the antenna 44A, a DL signal having a second wavelength and transmitted from the wireless control unit 3A.

(Example Advantage of Base Station System)

As described above, according to the present example embodiment, the base station system 200A includes: the analog sections 4A each having the loopback processing section 42A; and the wireless control unit 3A, and the wireless control unit 3A measures times required for transmissions between the analog sections 4A and the wireless control unit 3A on the basis of signals looped back in the analog sections 4A, and adjusts, in accordance with the measured times required for the transmissions, the timings of transmissions of the DL signal from the wireless control unit 3A to the analog sections 4A. By, for each of the analog sections 4A, making earlier the timing of transmission of data from the wireless control unit 3A to that analog section 4A by the delay time calculated for that analog section 4A, it is possible to arrange the timings of transmissions of a wireless signal from the plurality of analog sections 4A such that the transmissions coincide with each other.

According to the present example embodiment, by providing the analog sections 4A with a loopback mode, it is possible to measure, via the wireless control unit 3A, path delays between the wireless control unit 3A and the analog sections 4A, without introducing expensive digital circuitry into the analog sections 4A. In addition, since the path delays are measured inside the wireless control unit 3A, it is possible to carry out a setting of timing adjustment for each of the analog sections 4A without the need for manual work.

Further, in the base station system 200A in accordance with the present example embodiment, the wireless control unit 3A and the analog sections 4A are connected together via fiber-optic cables, and in a case where a deterioration of the optical module 130A of the wireless control unit 3A or the optical module 45A of the analog sections 4A is detected, the delay calculating section 32A transmits to the analog sections 4A an observation signal for measuring path delays. Thus, with the base station system 200A in accordance with the present example embodiment, it is possible to compensate for the path delays between the wireless control unit 3A and the plurality of analog sections 4A, even in a case where the path delays between the wireless control unit 3A and the analog sections 4A have change due to a deterioration of the optical module.

[Software Implementation Example]

Some or all of the functions of each of the wireless control unit 1A, 3A, 10, and 30 may be implemented by hardware such as an integrated circuit (IC chip), or may be implemented by software.

Figure 11:
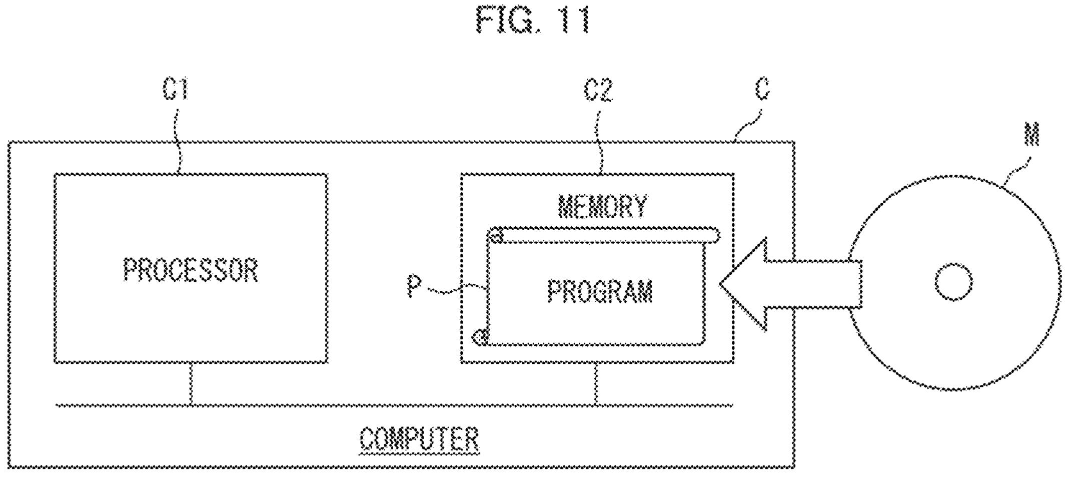
FIG. 11 is a block diagram illustrating an example of a hardware configuration of the wireless control units in accordance with the example embodiments.

In the latter case, each of the wireless control unit 1A, 3A, 10, and 30 is provided by, for example, a computer that executes instructions of a program that is software implementing the foregoing functions. An example (hereinafter, computer C) of such a computer is illustrated in FIG. 11. The computer C includes at least one processor C1 and at least one memory C2. The memory C2 has recorded thereon a program P for causing the computer C to operate as the wireless control unit 1A, 3A, 10, and 30. The processor C1 of the computer C retrieves the program P from the memory C2 and executes the program P, so that the functions of the wireless control unit 1A, 3A, 10, and 30 are implemented.

Examples of the processor C1 can include a central processing unit (CPU), a graphic processing unit (GPU), a digital signal processor (DSP), a micro processing a floating point number unit (MPU), processing unit (FPU), a physics processing unit (PPU), a tensor processing unit (TPU), a quantum processor, a microcontroller, and a combination thereof. Examples of the memory C2 can include a flash memory, a hard disk drive (HDD), a solid state drive (SSD), and a combination thereof.

The computer C may further include a random access memory (RAM) into which the program P is loaded at the time of execution and in which various kinds of data are temporarily stored. The computer C may further include a communication interface via which data is transmitted to and received from another apparatus. The computer C may further include an input-output interface via which input-output equipment such as a keyboard, a mouse, a display or a printer is connected.

The program P can be recorded on a non-transitory, tangible recording medium M capable of being read by the computer C. Examples of such a recording medium M can include a tape, a disk, a card, a semiconductor memory, and a programmable logic circuit. The computer C can obtain the program P via such a recording medium M. Alternatively, the program P can be transmitted through a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the above example embodiments.

[Additional Remark 2]

The whole or part of the example embodiments disclosed above can be described as, but not limited to, the following supplementary notes.

(Supplementary Note 1)

A base station system including: a wireless control unit; and a plurality of analog sections connected to the wireless control unit via communication cables, the wireless control unit including:

a first transmitting means for transmitting to the plurality of analog sections a control signal for performing control so as to cause the plurality of analog sections to transition to a loopback mode;

a second transmitting means for transmitting to the plurality of analog sections an observation signal for observing delay times in synchronization with an internal clock serving as a reference clock;

a calculating means for counting, for each of the plurality of analog sections, the number of clocks generated from when the observation signal is transmitted to when the observation signal is received, and calculating a path delay based on the number of clocks counted;

a third transmitting means for transmitting to the plurality of analog sections a control signal for canceling the loopback mode of the plurality of analog sections; and a fourth transmitting means for transmitting a downlink signal at a timing calculated for each of the plurality of analog sections according to the path delay, to a specific one of the plurality of analog sections which corresponds to the timing, each of the plurality of analog sections including:

mode switching means for transitioning to the loopback mode in a case of receiving a control signal for causing a transition to the loopback mode, and transitioning to a communication mode in a case of receiving a control signal for canceling the loopback mode;

loopback processing means for, in the loopback mode, reproducing a transmission signal from a reception signal received from the wireless control unit to transmit the transmission signal to the wireless control unit; and downlink signal transmitting means for, in the communication mode, outputting, by radio waves through an antenna, the downlink signal received from the wireless control unit.

(Supplementary Note 2)

The base station system described in supplementary note 1, in which the wireless control unit is connected to the plurality of analog sections via fiber-optic cables, and in a case where a deterioration of an optical module of the wireless control unit or an optical module of the plurality of analog sections is detected, the first transmitting means is configured to transmit a control signal for performing control so as to cause the plurality of analog sections to transition to the loopback mode.

(Supplementary Note 3)

A base station system including: a wireless control unit; and a plurality of analog sections connected to the wireless control unit via communication cables, the wireless control unit communicating with the plurality of analog sections by a wavelength division multiplexing (WDM) scheme, the wireless control unit including:

a second transmitting means for transmitting to the plurality of analog sections an observation signal for observing delay times in synchronization with an internal clock serving as a reference clock, the observation signal having a first wavelength;

a calculating means for counting, for each of the plurality of analog sections, the number of clocks generated from when the observation signal is transmitted to when the observation signal is received, and calculating a path delay based on the number of clocks counted; and a fourth transmitting means for transmitting a downlink signal at a timing calculated for each of the plurality of analog sections according to the path delay, to a specific one of the plurality of analog sections which corresponds to the timing, the downlink signal having a second wavelength different from the first wavelength, each of the plurality of analog sections including:

loopback processing means for reproducing a transmission signal from a reception signal having the first wavelength and received from the wireless control unit to transmit the transmission signal to the wireless control unit; and downlink signal transmitting means for outputting the downlink signal by radio waves through an antenna, the downlink signal having the second wavelength and received from the wireless control unit.

(Supplementary Note 4)

The base station system described in supplementary note 3, in which the second transmitting means is configured to transmit the observation signal in a case where a deterioration of an optical module of the wireless control unit or an optical module of the plurality of analog sections is detected.

(Supplementary Note 5)

A wireless communication method carried out by a base station system which includes a wireless control unit and a plurality of analog sections connected to the wireless control unit via communication cables, the wireless communication method including:

the wireless control unit transmitting to the plurality of analog sections a control signal for performing control so as to cause the plurality of analog sections to transition to a loopback mode;

the wireless control unit transmitting to the plurality of analog sections an observation signal for observing delay times in synchronization with an internal clock serving as a reference clock;

the wireless control unit counting, for each of the plurality of analog sections, the number of clocks generated from when the observation signal is transmitted to when the observation signal is received, and calculating a path delay based on the number of clocks counted;

the wireless control unit transmitting to the plurality of analog sections a control signal for canceling the loopback mode of the plurality of analog sections;

the wireless control unit transmitting a downlink signal at a timing calculated for each of the plurality of analog sections according to the path delay, to a specific one of the plurality of analog sections which corresponds to the timing;

the plurality of analog sections transitioning to the loopback mode in a case of receiving the control signal for causing a transition to the loopback mode;

the plurality of analog sections reproducing, in the loopback mode, a transmission signal from a reception signal received from the wireless control unit, to transmit the transmission signal to the wireless control unit;

the plurality of analog sections transitioning to a communication mode in a case of receiving a control signal for canceling the loopback mode; and the plurality of analog sections outputting, in the communication mode, the downlink signal received from the wireless control unit, by radio waves through an antenna.

(Supplementary Note 6)

A wireless communication method carried out by a base station system including: a wireless control unit; and a plurality of analog sections connected to the wireless control unit via communication cables, the wireless control unit communicating with the plurality of analog sections by a wavelength division multiplexing (WDM) scheme, the wireless communication method including:

the wireless control unit transmitting to the plurality of analog sections an observation signal for observing delay times in synchronization with an reference clock, the internal clock serving as a observation signal having a first wavelength;

the wireless control unit counting, for each of the plurality of analog sections, the number of clocks generated from when the observation signal is transmitted to when the observation signal is received, and calculating a path delay based on the number of clocks counted;

the wireless control unit transmitting a downlink signal at a timing calculated for each of the plurality of analog sections according to the path delay, to a specific one of the plurality of analog sections which corresponds to the timing, the downlink signal having a second wavelength different from the first wavelength;

the plurality of analog sections reproducing a transmission signal from a reception signal having the first wavelength and received from the wireless control unit, to transmit the transmission signal to the wireless control unit; and the plurality of analog sections outputting, by radio waves through an antenna, the downlink signal having the second wavelength and received from wireless communication unit.

(Supplementary Note 7)

A wireless control unit of a base station, the wireless control unit being connected, via communication cables, to a plurality of analog sections each of which outputs a downlink signal by radio waves through an antenna, the wireless control unit including:

a first transmitting means for transmitting to the plurality of analog sections a control signal for performing control so as to cause the plurality of analog sections to transition to a loopback mode;

a second transmitting means for transmitting to the plurality of analog sections an observation signal for observing delay times in synchronization with an internal clock serving as a reference clock;

a calculating means for counting, for each of the plurality of analog sections, the number of clocks generated from is when the observation signal transmitted to when the observation signal is received, and calculating a path delay based on the number of clocks counted;

a third transmitting means for transmitting to the plurality of analog sections a control signal for canceling the loopback mode of the plurality of analog sections; and a fourth transmitting means for transmitting a downlink signal at a timing calculated for each of the plurality of analog sections according to the path delay, to a specific one of the plurality of analog sections which corresponds to the timing.

(Supplementary Note 8)

A wireless control unit of a base station, the wireless control unit being connected, via communication cables, to a plurality of analog sections each of which outputs a downlink signal by radio waves through an antenna and communicating with the plurality of analog sections by a wavelength division multiplexing (WDM) scheme, the wireless control unit including:

a second transmitting means for transmitting to the plurality of analog sections an observation signal for observing delay times in synchronization with an internal clock serving g as a reference clock, the observation signal having a first wavelength;

a calculating means for counting, for each of the plurality of analog sections, the number of clocks generated from when the observation signal is transmitted to when the observation signal is received, and calculating a path delay based on the number of clocks counted; and a fourth transmitting means for transmitting a downlink signal at a timing calculated for each of the plurality of analog sections according to the path delay, to a specific one of the plurality of analog sections which corresponds to the timing, the downlink signal having a second wavelength different from the first wavelength.

(Supplementary Note 9)

A program for causing a wireless control unit of a base station, the wireless control unit being connected, via communication cables, to a plurality of analog sections each of which outputs a downlink signal by radio waves through an antenna, to carry out:

a first transmitting process of transmitting to the plurality of analog sections a control signal for performing control so as to cause the plurality of analog sections to transition to a loopback mode;

a second transmitting process of transmitting to the plurality of analog sections an observation signal for observing delay times in synchronization with an internal clock serving as a reference clock;

a calculating process of counting, for each of the plurality of analog sections, the number of clocks generated from when the observation signal is transmitted to when the observation signal is received, and calculating a path delay based on the number of clocks counted;

a third transmitting process of transmitting to the plurality of analog sections a control signal for canceling the loopback mode of the plurality of analog sections; and a fourth transmitting process of transmitting a downlink signal at a timing calculated for each of the plurality of analog sections according to the path delay, to a specific one of the plurality of analog sections which corresponds to the timing.

(Supplementary Note 10)

A program for causing a wireless control unit of a base station, the wireless control unit being connected, via communication cables, to a plurality of analog sections each of which outputs a downlink signal by radio waves through an antenna and communicating with the plurality of analog sections by a wavelength division multiplexing (WDM) scheme, to carry out:

a second transmitting process of transmitting to the plurality of analog sections an observation signal for observing delay times in synchronization with an internal clock serving as a reference clock, the observation signal having a first wavelength;

a calculating process of counting, for each of the plurality of analog sections, the number of clocks generated from when the observation signal is transmitted to when the observation signal is received, and calculating a path delay based on the number of clocks counted; and a fourth transmitting process of transmitting a downlink signal at a timing calculated for each of the plurality of analog sections according to the path delay, to a specific one of the plurality of analog sections which corresponds to the timing, the downlink signal having a second wavelength different from the first wavelength.

[Additional Remark 3]

The whole or part of the example embodiments disclosed above can be further described as the following supplementary notes.

(Supplementary Note 1)

A base station system including: a wireless control unit; and a plurality of analog sections connected to the wireless control unit via communication cables, the wireless control unit including at least one processor, the at least one processor carrying out:

a first transmitting process of transmitting to the plurality of analog sections a control signal for performing control so as to cause the plurality of analog sections to transition to a loopback mode;

a second transmitting process of transmitting to the plurality of analog sections an observation signal for observing delay times in synchronization with an internal clock serving as a reference clock;

a calculating process of counting, for each of the plurality of analog sections, the number of clocks generated from when the observation signal is transmitted to when the observation signal is received, and calculating a path delay based on the number of clocks counted;

a third transmitting process of transmitting to the plurality of analog sections a control signal for canceling the loopback mode of the plurality of analog sections; and a fourth transmitting process of transmitting a downlink signal at a timing calculated for each of the plurality of analog sections according to the path delay, to a specific one of the plurality of analog sections which corresponds to the timing, each of the plurality of analog sections including:

mode switching circuitry configured to transition to the loopback mode in a case of receiving a control signal for causing a transition to the loopback mode, and transition to a communication mode in a case of receiving a control signal for canceling the loopback mode;

loopback circuitry configured to, in the loopback mode, reproduce a transmission signal from a reception signal received from the wireless control unit to transmit the transmission signal to the wireless control unit; and downlink signal transmitting circuitry configured to, in the communication mode, output the downlink signal received from the wireless control unit, by radio waves through an antenna.

(Supplementary Note 2)

The base station system described in supplementary note 1, in which the wireless control unit is connected to the plurality of analog sections via fiber-optic cables, and in the first transmitting process, in a case where a deterioration of an optical module of the wireless control unit or an optical module of the plurality of analog sections is detected, the at least one processor transmits a control signal for performing control so as to cause the plurality of analog sections to transition to the loopback mode.

(Supplementary Note 3)

A base station system including: a wireless control unit; and a plurality of analog sections connected to the wireless control unit via communication cables, the wireless control unit communicating with the plurality of analog sections by a wavelength division multiplexing (WDM) scheme, the wireless control unit including at least one processor, the at least one processor carrying out:

a second transmitting process of transmitting to the plurality of analog sections an observation signal for observing delay times in synchronization with an internal clock serving as a reference clock, the observation signal having a first wavelength;

a calculating process of counting, for each of the plurality of analog sections, the number of clocks generated from when the observation signal is transmitted to when the observation signal is received, and calculating a path delay based on the number of clocks counted; and a fourth transmitting process of transmitting a downlink signal at a timing calculated for each of the plurality of analog sections according to the path delay, to a specific one of the plurality of analog sections which corresponds to the timing, the downlink signal having a second wavelength different from the first wavelength, each of the plurality of analog sections including:

loopback circuitry configured to reproduce a transmission signal from a reception signal having the first wavelength and received from the wireless control unit, to transmit the transmission signal to the wireless control unit; and downlink signal transmitting circuitry configured to output the downlink signal by radio waves through an antenna, the downlink signal having the second wavelength and received from the wireless control unit.

(Supplementary Note 4)

The base station system described in supplementary note 3, in which in the second transmitting process, in a case where a deterioration of an optical module of the wireless control unit or an optical module of the plurality of analog sections is detected, the at least one processor transmits the observation signal.

(Supplementary Note 5)

A wireless communication method carried out by a base station system which includes a wireless control unit and a plurality of analog sections connected to the wireless control unit via communication cables, the wireless communication method including:

the wireless control unit transmitting to the plurality of analog sections a control signal for performing control so as to cause the plurality of analog sections to transition to a loopback mode;

the wireless control unit transmitting to the plurality of analog sections an observation signal for observing delay times in synchronization with an internal clock serving as a reference clock;

the wireless control unit counting, for each of the plurality of analog sections, the number of clocks generated from when the observation signal is transmitted to when the observation signal is received, and calculating a path delay based on the number of clocks counted;

the wireless control unit transmitting to the plurality of analog sections a control signal for canceling the loopback mode of the plurality of analog sections;

the wireless control unit transmitting a downlink signal at a timing calculated for each of the plurality of analog sections according to the path delay, to a specific one of the plurality of analog sections which corresponds to the timing;

the plurality of analog sections transitioning to the loopback mode in a case of receiving the control signal for causing a transition to the loopback mode;

the plurality of analog sections reproducing, in the loopback mode, a transmission signal from a reception signal received from the wireless control unit, to transmit the transmission signal to the wireless control unit;

the plurality of analog sections transitioning to a communication mode in a case of receiving a control signal for canceling the loopback mode; and the plurality of analog sections outputting, in the communication mode, the downlink signal received from the wireless control unit, by radio waves through an antenna.

(Supplementary Note 6)

A wireless communication method carried out by a base station system including: a wireless control unit; and a plurality of analog sections connected to the wireless control unit via communication cables, the wireless control unit communicating with the plurality of analog sections by a wavelength division multiplexing (WDM) scheme, the wireless communication method including:

the wireless control unit transmitting to the plurality of analog sections an observation signal for observing delay times in synchronization with an internal clock serving as a reference clock, the observation signal having a first wavelength;

the wireless control unit counting, for each of the plurality of analog sections, the number of clocks generated from when the observation signal is transmitted to when the observation signal is received, and calculating a path delay based on the number of clocks counted;

the wireless control unit transmitting a downlink signal at a timing calculated for each of the plurality of analog sections according to the path delay, to a specific one of the plurality of analog sections which corresponds to the timing, the downlink signal having a second wavelength different from the first wavelength;

the plurality of analog sections reproducing a transmission signal from a reception signal having the first wavelength and received from the wireless control unit, to transmit the transmission signal to the wireless control unit; and the plurality of analog sections outputting, by radio waves through an antenna, the downlink signal having the second wavelength and received from wireless communication unit.

(Supplementary Note 7)

A wireless control unit of a base station, the wireless control unit being connected, via communication cables, to a plurality of analog sections each of which outputs a downlink signal by radio waves through an antenna, the wireless control unit including:

the wireless control unit including at least one processor, the at least one processor carrying out:

a first transmitting process of transmitting to the plurality of analog sections a control signal for performing control so as to cause the plurality of analog sections to transition to a loopback mode;

a second transmitting process of transmitting to the plurality of analog sections an observation signal for observing delay times in synchronization with an internal clock serving as a reference clock;

a calculating process of counting, for each of the plurality of analog sections, the number of clocks generated from when the observation signal is transmitted to when the observation signal is received, and calculating a path delay based on the number of clocks counted;

a third transmitting process of transmitting to the plurality of analog sections a control signal for canceling the loopback mode of the plurality of analog sections; and a fourth transmitting process of transmitting a downlink signal at a timing calculated for each of the plurality of analog sections according to the path delay, to a specific one of the plurality of analog sections which corresponds to the timing, (Supplementary Note 8)

A wireless control unit of a base station, the wireless control unit being connected, via communication cables, to a plurality of analog sections each of which outputs a downlink signal by radio waves through an antenna and communicating with the plurality of analog sections by a wavelength division multiplexing (WDM) scheme, the wireless control unit including at least one processor, the at least one processor carrying out:

a second transmitting process of transmitting to the plurality of analog sections an observation signal for observing delay times in synchronization with an internal clock serving as a reference clock, the observation signal having a first wavelength;

a calculating process of counting, for each of the plurality of analog sections, the number of clocks generated from when the observation signal is transmitted to when the observation signal is received, and calculating a path delay based on the number of clocks counted; and a fourth transmitting process of transmitting a downlink signal at a timing calculated for each of the plurality of analog sections according to the path delay, to a specific one of the plurality of analog sections which corresponds to the timing, the downlink signal having a second wavelength different from the first wavelength.

(Supplementary Note 9)

A computer-readable, non-transitory recording medium having stored therein a control program for controlling the wireless control unit described in supplementary note 7, the program causing the at least one processor to carry out the first transmitting process, the second transmitting process, the calculating process, the third transmitting process, and the fourth transmitting process.

(Supplementary Note 10)

A computer-readable, non-transitory recording medium having stored therein a control program for controlling the wireless control unit described in supplementary note 8, the program causing the at least one processor to carry out the second transmitting process, the calculating process, and the fourth transmitting process.

REFERENCE SIGNS LIST

1, 2, 100A, 200A: Base station system
1A, 3A, 10, 30: Wireless control unit
2A, 4A, 20, 40: Analog section
11: First transmitting section
12, 32: Second transmitting section
13, 33: Calculating section
14: Third transmitting section
14A, 34A: Detecting section
15, 35: Fourth transmitting section
21, 11A, 21A: Mode switching section
22, 22A, 42, 42A: Loopback processing section
23, 13A, 23A, 33A, 43, 43A: DL signal transmitting section
S1, S2: Wireless communication method

The invention claimed is:

1. A wireless control unit of a base station, the wireless control unit being connected, via communication cables, to a plurality of analog sections each of which outputs a downlink signal by radio waves through an antenna, the wireless control unit comprising:

a memory configured to store instructions; and at least one processor which executes the instructions to transmit to the plurality of analog sections a first control signal for performing control so as to cause the plurality of analog sections to transition to a loopback mode, transmit to the plurality of analog sections an observation signal for observing delay times in synchronization with an internal clock serving as a reference clock, for each of the plurality of analog sections, count the number of clocks generated from when the observation signal is transmitted to when the observation signal is received, and calculate a path delay based on the number of clocks counted, transmit to the plurality of analog sections a second control signal for canceling the loopback mode of the plurality of analog sections, and transmit a downlink signal at a timing calculated for each of the plurality of analog sections according to the path delay, to a specific one of the plurality of analog sections which corresponds to the timing.

2. A base station system comprising:

the wireless control unit according to claim 1; and a plurality of analog sections connected to the wireless control unit via communication cables, each of the plurality of analog sections including:

mode switching circuitry configured to transition to the loopback mode in a case of receiving a control signal for causing a transition to the loopback mode, and transition to a communication mode in a case of receiving a control signal for canceling the loopback mode;

loopback circuitry configured to, in the loopback mode, reproduce a transmission signal from a reception signal received from the wireless control unit to transmit the transmission signal to the wireless control unit; and downlink signal transmitting circuitry configured to, in the communication mode, output the downlink signal received from the wireless control unit, by radio waves through an antenna.

3. The base station system according to claim 2, wherein the wireless control unit is connected to the plurality of analog sections via fiber-optic cables, and in transmitting the first control signal, in a case where a deterioration of an optical module of the wireless control unit or an optical module of the plurality of analog sections is detected, the at least one processor transmits a control signal for performing control so as to cause the plurality of analog sections to transition to the loopback mode.

4. A computer-readable, non-transitory recording medium having recorded thereon a program for causing a computer to function as the wireless control unit according to claim 1, the program causing the computer to carry out: a process of transmitting the first control signal; a process of transmitting the observation signal; a process of calculating the path delay; a process of transmitting the second control signal; and a process of transmitting the downlink signal.

5. A wireless control unit of a base station, the wireless control unit being connected, via communication cables, to a plurality of analog sections each of which outputs a downlink signal by radio waves through an antenna and communicating with the plurality of analog sections by a wavelength division multiplexing (WDM) scheme, the wireless control unit comprising:

a memory configured to store instructions; and at least one processor which executes the instructions to transmit to the plurality of analog sections an observation signal for observing delay times in synchronization with an internal clock serving as a reference clock, the observation signal having a first wavelength, for each of the plurality of analog sections, count the number of clocks generated from when the observation signal is transmitted to when the observation signal is received, and calculate a path delay based on the number of clocks counted, and transmit a downlink signal at a timing calculated for each of the plurality of analog sections according to the path delay, to a specific one of the plurality of analog sections which corresponds to the timing, the downlink signal having a second wavelength different from the first wavelength.

6. A base station system comprising:

the wireless control unit according to claim 5; and a plurality of analog sections connected to the wireless control unit via communication cables, the wireless control unit communicating with the plurality of analog sections by a wavelength division multiplexing (WDM) scheme, each of the plurality of analog sections including:

loopback circuitry configured to reproduce a transmission signal from a reception signal having the first wavelength and received from the wireless control unit, to transmit the transmission signal to the wireless control unit; and downlink signal transmitting circuitry configured to output the downlink signal by radio waves through an antenna, the downlink signal having the second wavelength and received from the wireless control unit.

7. The base station system according to claim 6, wherein in transmitting the observation signal, in a case where a deterioration of an optical module of the wireless control unit or an optical module of the plurality of analog sections is detected, the at least one processor transmits the observation signal.

8. A computer-readable, non-transitory recording medium having recorded thereon a program for causing a computer to function as the wireless control unit according to claim 5, the program causing the computer to carry out a process of transmitting the observation signal; a process of calculating the path delay; and a process of transmitting the downlink signal.

9. A wireless communication method carried out by a base station system which includes a wireless control unit and a plurality of analog sections connected to the wireless control unit via communication cables, the wireless communication method comprising:

the wireless control unit transmitting to the plurality of analog sections a control signal for performing control so as to cause the plurality of analog sections to transition to a loopback mode;

the wireless control unit transmitting to the plurality of analog sections an observation signal for observing delay times in synchronization with an internal clock serving as a reference clock;

the wireless control unit counting, for each of the plurality of analog sections, the number of clocks generated from the observation signal is when transmitted to when the observation signal is received, and calculating a path delay based on the number of clocks counted;

the wireless control unit transmitting to the plurality of analog sections a control signal for canceling the loopback mode of the plurality of analog sections;

the wireless control unit transmitting a downlink signal at a timing calculated for each of the plurality of analog sections according to the path delay, to a specific one of the plurality of analog sections which corresponds to the timing;

the plurality of analog sections transitioning to the loopback mode in a case of receiving the control signal for causing a transition to the loopback mode;

the plurality of analog sections reproducing, in the loopback mode, a transmission signal from a reception signal received from the wireless control unit, to transmit the transmission signal to the wireless control unit;

the plurality of analog sections transitioning to a communication mode in a case of receiving a control signal for canceling the loopback mode; and the plurality of analog sections outputting, in the communication mode, the downlink signal received from the wireless control unit, by radio waves through an antenna.

* * * * *